(12) United States Patent
Pav

(10) Patent No.: US 8,112,375 B2
(45) Date of Patent: Feb. 7, 2012

(54) WAVELENGTH SELECTION AND OUTLIER DETECTION IN REDUCED RANK LINEAR MODELS

(75) Inventor: Steven E. Pav, San Francisco, CA (US)

(73) Assignee: Nellcor Puritan Bennett LLC, Boulder, CO (US)

(*) Notice: Subject to any disclaimer, the term of this patent is extended or adjusted under 35 U.S.C. 154(b) by 497 days.

(21) Appl. No.: 12/412,971

(22) Filed: Mar. 27, 2009

(65) Prior Publication Data

US 2009/0247083 A1 Oct. 1, 2009

Related U.S. Application Data

(60) Provisional application No. 61/072,601, filed on Mar. 31, 2008.

(51) Int. Cl.
- *G06F 17/00* (2006.01)
- *G05B 13/02* (2006.01)
- *A61B 5/00* (2006.01)

(52) U.S. Cl. .............................. 706/45; 700/28; 600/300
(58) Field of Classification Search .......................... None
See application file for complete search history.

(56) References Cited

U.S. PATENT DOCUMENTS

| | | | |
|---|---|---|---|
| 3,638,640 A | 2/1972 | Shaw | |
| 3,721,813 A | 3/1973 | Condon et al. | |
| 4,586,513 A | 5/1986 | Hamaguri | |
| 4,603,700 A | 8/1986 | Nichols et al. | |
| 4,621,643 A | 11/1986 | New, Jr. et al. | |
| 4,653,498 A | 3/1987 | New, Jr. et al. | |
| 4,685,464 A | 8/1987 | Goldberger et al. | |
| 4,694,833 A | 9/1987 | Hamaguri | |
| 4,697,593 A | 10/1987 | Evans et al. | |
| 4,700,708 A | 10/1987 | New, Jr. et al. | |
| 4,714,080 A | 12/1987 | Edgar, Jr. et al. | |
| 4,714,341 A | 12/1987 | Hamaguri et al. | |
| 4,759,369 A | 7/1988 | Taylor | |
| 4,770,179 A | 9/1988 | New, Jr. et al. | |
| 4,773,422 A | 9/1988 | Isaacson et al. | |
| 4,776,339 A | 10/1988 | Schreiber | |
| 4,781,195 A | 11/1988 | Martin | |
| 4,796,636 A | 1/1989 | Branstetter et al. | |
| 4,800,495 A | 1/1989 | Smith | |

(Continued)

FOREIGN PATENT DOCUMENTS

DE         19632361         2/1997

(Continued)

OTHER PUBLICATIONS

Such, Hans Olaf; "Optoelectronic Non-invasive Vascular Diagnostics Using multiple Wavelength and Imaging Approach," Dissertation, (1998).

(Continued)

*Primary Examiner* — Alan Chen

(57) ABSTRACT

There is provided an optimization system and method for identifying useful channels. The method for selecting useful channels includes embedding a discrete predictor problem into continuous space of a predictor preweighting and executing an optimization algorithm to optimize a preweighting vector, wherein the optimization algorithm determines the relative importance of the each predictor. Also, the method includes constructing n different models, wherein a $k^{th}$ model comprises the k most important predictors and comparing the models using an information criterion to allow for automatic selection of a subset of the predictors. Additionally, an analytical Jacobian of the partial least squares regression vector is derived with respect to the predictor weighting to optimize the predictor weighting and select useful channels for use in the non-invasive medical device.

15 Claims, 5 Drawing Sheets

U.S. PATENT DOCUMENTS

| | | |
|---|---|---|
| 4,800,885 A | 1/1989 | Johnson |
| 4,802,486 A | 2/1989 | Goodman et al. |
| 4,805,623 A | 2/1989 | Jöbsis |
| 4,807,630 A | 2/1989 | Malinouskas |
| 4,807,631 A | 2/1989 | Hersh et al. |
| 4,819,646 A | 4/1989 | Cheung et al. |
| 4,819,752 A | 4/1989 | Zelin |
| 4,824,242 A | 4/1989 | Frick et al. |
| 4,825,872 A | 5/1989 | Tan et al. |
| 4,825,879 A | 5/1989 | Tan et al. |
| 4,830,014 A | 5/1989 | Goodman et al. |
| 4,832,484 A | 5/1989 | Aoyagi et al. |
| 4,846,183 A | 7/1989 | Martin |
| 4,848,901 A | 7/1989 | Hood, Jr. |
| 4,854,699 A | 8/1989 | Edgar, Jr. |
| 4,859,056 A | 8/1989 | Prosser et al. |
| 4,859,057 A | 8/1989 | Taylor et al. |
| 4,863,265 A | 9/1989 | Flower et al. |
| 4,865,038 A | 9/1989 | Rich et al. |
| 4,867,557 A | 9/1989 | Takatani et al. |
| 4,869,253 A | 9/1989 | Craig, Jr. et al. |
| 4,869,254 A | 9/1989 | Stone et al. |
| 4,880,304 A | 11/1989 | Jaeb et al. |
| 4,883,055 A | 11/1989 | Merrick |
| 4,883,353 A | 11/1989 | Hausmann et al. |
| 4,890,619 A | 1/1990 | Hatschek |
| 4,892,101 A | 1/1990 | Cheung et al. |
| 4,901,238 A | 2/1990 | Suzuki et al. |
| 4,908,762 A | 3/1990 | Suzuki et al. |
| 4,911,167 A | 3/1990 | Corenman et al. |
| 4,913,150 A | 4/1990 | Cheung et al. |
| 4,926,867 A | 5/1990 | Kanda et al. |
| 4,927,264 A | 5/1990 | Shiga et al. |
| 4,928,692 A | 5/1990 | Goodman et al. |
| 4,934,372 A | 6/1990 | Corenman et al. |
| 4,936,679 A | 6/1990 | Mersch |
| 4,938,218 A | 7/1990 | Goodman et al. |
| 4,942,877 A | 7/1990 | Sakai et al. |
| 4,948,248 A | 8/1990 | Lehman |
| 4,955,379 A | 9/1990 | Hall |
| 4,960,126 A | 10/1990 | Conlon et al. |
| 4,964,408 A | 10/1990 | Hink et al. |
| 4,971,062 A | 11/1990 | Hasebe et al. |
| 4,972,331 A | 11/1990 | Chance |
| 4,974,591 A | 12/1990 | Awazu et al. |
| 5,007,423 A | 4/1991 | Branstetter et al. |
| 5,025,791 A | 6/1991 | Niwa |
| RE033,643 E | 7/1991 | Isaacson et al. |
| 5,028,787 A | 7/1991 | Rosenthal et al. |
| 5,040,539 A | 8/1991 | Schmitt et al. |
| 5,054,488 A | 10/1991 | Muz |
| 5,055,671 A | 10/1991 | Jones |
| 5,058,588 A | 10/1991 | Kaestle |
| 5,065,749 A | 11/1991 | Hasebe et al. |
| 5,066,859 A | 11/1991 | Karkar et al. |
| 5,069,213 A | 12/1991 | Polczynski |
| 5,078,136 A | 1/1992 | Stone et al. |
| 5,084,327 A | 1/1992 | Stengel |
| 5,088,493 A | 2/1992 | Giannini et al. |
| 5,090,410 A | 2/1992 | Saper et al. |
| 5,094,239 A | 3/1992 | Jaeb et al. |
| 5,094,240 A | 3/1992 | Muz |
| 5,099,841 A | 3/1992 | Heinonen et al. |
| 5,099,842 A | 3/1992 | Mannheimer et al. |
| H001039 H | 4/1992 | Tripp et al. |
| 5,104,623 A | 4/1992 | Miller |
| 5,109,849 A | 5/1992 | Goodman et al. |
| 5,111,817 A | 5/1992 | Clark et al. |
| 5,113,861 A | 5/1992 | Rother |
| 5,119,815 A | 6/1992 | Chance |
| 5,122,974 A | 6/1992 | Chance |
| 5,125,403 A | 6/1992 | Culp |
| 5,127,406 A | 7/1992 | Yamaguchi |
| 5,131,391 A | 7/1992 | Sakai et al. |
| 5,140,989 A | 8/1992 | Lewis et al. |
| 5,152,296 A | 10/1992 | Simons |
| 5,154,175 A | 10/1992 | Gunther |
| 5,158,082 A | 10/1992 | Jones |
| 5,167,230 A | 12/1992 | Chance |
| 5,170,786 A | 12/1992 | Thomas et al. |
| 5,188,108 A | 2/1993 | Secker et al. |
| 5,190,038 A | 3/1993 | Polson et al. |
| 5,193,542 A | 3/1993 | Missanelli et al. |
| 5,193,543 A | 3/1993 | Yelderman |
| 5,203,329 A | 4/1993 | Takatani et al. |
| 5,209,230 A | 5/1993 | Swedlow et al. |
| 5,213,099 A | 5/1993 | Tripp et al. |
| 5,216,598 A | 6/1993 | Branstetter et al. |
| 5,217,012 A | 6/1993 | Young et al. |
| 5,217,013 A | 6/1993 | Lewis et al. |
| 5,218,962 A | 6/1993 | Mannheimer et al. |
| 5,224,478 A | 7/1993 | Sakai et al. |
| 5,226,417 A | 7/1993 | Swedlow et al. |
| 5,228,440 A | 7/1993 | Chung et al. |
| 5,237,994 A | 8/1993 | Goldberger |
| 5,239,185 A | 8/1993 | Ito et al. |
| 5,246,002 A | 9/1993 | Prosser |
| 5,246,003 A | 9/1993 | DeLonzor |
| 5,247,931 A | 9/1993 | Norwood |
| 5,247,932 A | 9/1993 | Chung et al. |
| 5,249,576 A | 10/1993 | Goldberger et al. |
| 5,253,645 A | 10/1993 | Friedman et al. |
| 5,253,646 A | 10/1993 | Delpy et al. |
| 5,259,381 A | 11/1993 | Cheung et al. |
| 5,259,761 A | 11/1993 | Schnettler et al. |
| 5,263,244 A | 11/1993 | Centa et al. |
| 5,267,562 A | 12/1993 | Ukawa et al. |
| 5,267,563 A | 12/1993 | Swedlow et al. |
| 5,273,036 A | 12/1993 | Kronberg et al. |
| 5,275,159 A | 1/1994 | Griebel |
| 5,279,295 A | 1/1994 | Martens et al. |
| 5,285,783 A | 2/1994 | Secker |
| 5,285,784 A | 2/1994 | Seeker |
| 5,287,853 A | 2/1994 | Vester et al. |
| 5,291,884 A | 3/1994 | Heinemann et al. |
| 5,297,548 A | 3/1994 | Pologe |
| 5,299,120 A | 3/1994 | Kaestle |
| 5,299,570 A | 4/1994 | Hatschek |
| 5,309,908 A | 5/1994 | Friedman et al. |
| 5,311,865 A | 5/1994 | Mayeux |
| 5,313,940 A | 5/1994 | Fuse et al. |
| 5,323,776 A | 6/1994 | Blakely et al. |
| 5,329,922 A | 7/1994 | Atlee, III |
| 5,337,744 A | 8/1994 | Branigan |
| 5,339,810 A | 8/1994 | Ivers et al. |
| 5,343,818 A | 9/1994 | McCarthy et al. |
| 5,343,869 A | 9/1994 | Pross et al. |
| 5,348,003 A | 9/1994 | Caro |
| 5,348,004 A | 9/1994 | Hollub et al. |
| 5,349,519 A | 9/1994 | Kaestle |
| 5,349,952 A | 9/1994 | McCarthy et al. |
| 5,349,953 A | 9/1994 | McCarthy et al. |
| 5,351,685 A | 10/1994 | Potratz |
| 5,353,799 A | 10/1994 | Chance |
| 5,355,880 A | 10/1994 | Thomas et al. |
| 5,355,882 A | 10/1994 | Ukawa et al. |
| 5,361,758 A | 11/1994 | Hall et al. |
| 5,365,066 A | 11/1994 | Krueger, Jr. et al. |
| 5,368,025 A | 11/1994 | Young et al. |
| 5,368,026 A | 11/1994 | Swedlow et al. |
| 5,368,224 A | 11/1994 | Richardson et al. |
| 5,372,136 A | 12/1994 | Steuer et al. |
| 5,377,675 A | 1/1995 | Ruskewicz et al. |
| 5,385,143 A | 1/1995 | Aoyagi |
| 5,387,122 A | 2/1995 | Goldberger et al. |
| 5,390,670 A | 2/1995 | Centa et al. |
| 5,392,777 A | 2/1995 | Swedlow et al. |
| 5,398,680 A | 3/1995 | Polson et al. |
| 5,402,777 A | 4/1995 | Warring et al. |
| 5,411,023 A | 5/1995 | Morris, Sr. et al. |
| 5,411,024 A | 5/1995 | Thomas et al. |
| 5,413,099 A | 5/1995 | Schmidt et al. |
| 5,413,100 A | 5/1995 | Barthelemy et al. |
| 5,413,101 A | 5/1995 | Sugiura |
| 5,413,102 A | 5/1995 | Schmidt et al. |
| 5,417,207 A | 5/1995 | Young et al. |
| 5,421,329 A | 6/1995 | Casciani et al. |

| Patent No. | Date | Inventor |
|---|---|---|
| 5,425,360 A | 6/1995 | Nelson |
| 5,425,362 A | 6/1995 | Siker et al. |
| 5,427,093 A | 6/1995 | Ogawa et al. |
| 5,429,128 A | 7/1995 | Cadell et al. |
| 5,429,129 A | 7/1995 | Lovejoy et al. |
| 5,431,159 A | 7/1995 | Baker et al. |
| 5,431,170 A | 7/1995 | Mathews |
| 5,437,275 A | 8/1995 | Amundsen et al. |
| 5,438,986 A | 8/1995 | Disch et al. |
| 5,448,991 A | 9/1995 | Polson et al. |
| 5,452,717 A | 9/1995 | Branigan et al. |
| 5,465,714 A | 11/1995 | Scheuing |
| 5,469,845 A | 11/1995 | DeLonzor et al. |
| RE035,122 E | 12/1995 | Corenman et al. |
| 5,482,034 A | 1/1996 | Lewis et al. |
| 5,482,036 A | 1/1996 | Diab et al. |
| 5,483,646 A | 1/1996 | Uchikoga |
| 5,485,847 A | 1/1996 | Baker, Jr. |
| 5,490,505 A | 2/1996 | Diab et al. |
| 5,490,523 A | 2/1996 | Isaacson et al. |
| 5,491,299 A | 2/1996 | Naylor et al. |
| 5,494,032 A | 2/1996 | Robinson et al. |
| 5,497,771 A | 3/1996 | Rosenheimer |
| 5,499,627 A | 3/1996 | Steuer et al. |
| 5,503,148 A | 4/1996 | Pologe et al. |
| 5,505,199 A | 4/1996 | Kim |
| 5,507,286 A | 4/1996 | Solenberger |
| 5,517,988 A | 5/1996 | Gerhard |
| 5,520,177 A | 5/1996 | Ogawa et al. |
| 5,521,851 A | 5/1996 | Wei et al. |
| 5,522,388 A | 6/1996 | Ishikawa et al. |
| 5,524,617 A | 6/1996 | Mannheimer |
| 5,529,064 A | 6/1996 | Rall et al. |
| 5,533,507 A | 7/1996 | Potratz et al. |
| 5,551,423 A | 9/1996 | Sugiura |
| 5,551,424 A | 9/1996 | Morrison et al. |
| 5,553,614 A | 9/1996 | Chance |
| 5,553,615 A | 9/1996 | Carim et al. |
| 5,555,882 A | 9/1996 | Richardson et al. |
| 5,558,096 A | 9/1996 | Palatnik |
| 5,560,355 A | 10/1996 | Merchant et al. |
| 5,564,417 A | 10/1996 | Chance |
| 5,575,284 A | 11/1996 | Athan et al. |
| 5,575,285 A | 11/1996 | Takanashi et al. |
| 5,577,500 A | 11/1996 | Potratz |
| 5,582,169 A | 12/1996 | Oda et al. |
| 5,584,296 A | 12/1996 | Cui et al. |
| 5,588,425 A | 12/1996 | Sackner et al. |
| 5,588,427 A | 12/1996 | Tien |
| 5,590,652 A | 1/1997 | Inai |
| 5,595,176 A | 1/1997 | Yamaura |
| 5,596,986 A | 1/1997 | Goldfarb |
| 5,611,337 A | 3/1997 | Bukta |
| 5,617,852 A | 4/1997 | MacGregor |
| 5,619,992 A | 4/1997 | Guthrie et al. |
| 5,626,140 A | 5/1997 | Feldman et al. |
| 5,630,413 A | 5/1997 | Thomas et al. |
| 5,632,272 A | 5/1997 | Diab et al. |
| 5,632,273 A | 5/1997 | Suzuki |
| 5,634,459 A | 6/1997 | Gardosi |
| 5,638,593 A | 6/1997 | Gerhardt et al. |
| 5,638,818 A | 6/1997 | Diab et al. |
| 5,645,059 A | 7/1997 | Fein et al. |
| 5,645,060 A | 7/1997 | Yorkey |
| 5,645,440 A | 7/1997 | Tobler et al. |
| 5,660,567 A | 8/1997 | Nierlich et al. |
| 5,662,105 A | 9/1997 | Tien |
| 5,662,106 A | 9/1997 | Swedlow et al. |
| 5,666,952 A | 9/1997 | Fuse et al. |
| 5,671,529 A | 9/1997 | Nelson |
| 5,673,692 A | 10/1997 | Schulze et al. |
| 5,673,693 A | 10/1997 | Solenberger |
| 5,676,139 A | 10/1997 | Goldberger et al. |
| 5,676,141 A | 10/1997 | Hollub |
| 5,678,544 A | 10/1997 | DeLonzor et al. |
| 5,680,857 A | 10/1997 | Pelikan et al. |
| 5,685,299 A | 11/1997 | Diab et al. |
| 5,685,301 A | 11/1997 | Klomhaus |
| 5,687,719 A | 11/1997 | Sato et al. |
| 5,687,722 A | 11/1997 | Tien et al. |
| 5,692,503 A | 12/1997 | Keunstner |
| 5,692,505 A | 12/1997 | Fouts |
| 5,709,205 A | 1/1998 | Bukta |
| 5,713,355 A | 2/1998 | Richardson et al. |
| 5,724,967 A | 3/1998 | Venkatachalam |
| 5,727,547 A | 3/1998 | Levinson et al. |
| 5,730,124 A | 3/1998 | Yamauchi |
| 5,731,582 A | 3/1998 | West |
| D393,830 S | 4/1998 | Tobler et al. |
| 5,743,260 A | 4/1998 | Chung et al. |
| 5,743,263 A | 4/1998 | Baker, Jr. |
| 5,746,206 A | 5/1998 | Mannheimer |
| 5,746,697 A | 5/1998 | Swedlow et al. |
| 5,752,914 A | 5/1998 | DeLonzor et al. |
| 5,755,226 A | 5/1998 | Carim et al. |
| 5,758,644 A | 6/1998 | Diab et al. |
| 5,760,910 A | 6/1998 | Lepper, Jr. et al. |
| 5,766,125 A | 6/1998 | Aoyagi et al. |
| 5,766,127 A | 6/1998 | Pologe et al. |
| 5,769,785 A | 6/1998 | Diab et al. |
| 5,772,587 A | 6/1998 | Gratton et al. |
| 5,774,213 A | 6/1998 | Trebino et al. |
| 5,776,058 A | 7/1998 | Levinson et al. |
| 5,776,059 A | 7/1998 | Kaestle |
| 5,779,630 A | 7/1998 | Fein et al. |
| 5,779,631 A | 7/1998 | Chance |
| 5,782,237 A | 7/1998 | Casciani et al. |
| 5,782,756 A | 7/1998 | Mannheimer |
| 5,782,758 A | 7/1998 | Ausec et al. |
| 5,786,592 A | 7/1998 | Hök |
| 5,790,729 A | 8/1998 | Pologe et al. |
| 5,792,052 A | 8/1998 | Isaacson et al. |
| 5,795,292 A | 8/1998 | Lewis et al. |
| 5,797,841 A | 8/1998 | DeLonzor et al. |
| 5,800,348 A | 9/1998 | Kaestle |
| 5,800,349 A | 9/1998 | Isaacson et al. |
| 5,803,910 A | 9/1998 | Potratz |
| 5,807,246 A | 9/1998 | Sakaguchi et al. |
| 5,807,247 A | 9/1998 | Merchant et al. |
| 5,807,248 A | 9/1998 | Mills |
| 5,810,723 A | 9/1998 | Aldrich |
| 5,810,724 A | 9/1998 | Gronvall |
| 5,813,980 A | 9/1998 | Levinson et al. |
| 5,817,008 A | 10/1998 | Rafert et al. |
| 5,817,009 A | 10/1998 | Rosenheimer et al. |
| 5,817,010 A | 10/1998 | Hibl |
| 5,818,985 A | 10/1998 | Merchant et al. |
| 5,820,550 A | 10/1998 | Polson et al. |
| 5,823,950 A | 10/1998 | Diab et al. |
| 5,823,952 A | 10/1998 | Levinson et al. |
| 5,827,182 A | 10/1998 | Raley et al. |
| 5,830,135 A | 11/1998 | Bosque et al. |
| 5,830,136 A | 11/1998 | DeLonzor et al. |
| 5,830,137 A | 11/1998 | Scharf |
| 5,830,139 A | 11/1998 | Abreu |
| 5,839,439 A | 11/1998 | Nierlich et al. |
| RE036,000 E | 12/1998 | Swedlow et al. |
| 5,842,979 A | 12/1998 | Jarman et al. |
| 5,842,981 A | 12/1998 | Larsen et al. |
| 5,842,982 A | 12/1998 | Mannheimer |
| 5,846,190 A | 12/1998 | Woehrle |
| 5,851,178 A | 12/1998 | Aronow |
| 5,851,179 A | 12/1998 | Ritson et al. |
| 5,853,364 A | 12/1998 | Baker, Jr. et al. |
| 5,860,919 A | 1/1999 | Kiani-Azarbayjany et al. |
| 5,865,736 A | 2/1999 | Baker, Jr. et al. |
| 5,871,442 A | 2/1999 | Madarasz et al. |
| 5,873,821 A | 2/1999 | Chance et al. |
| 5,879,294 A | 3/1999 | Anderson et al. |
| 5,885,213 A | 3/1999 | Richardson et al. |
| 5,890,929 A | 4/1999 | Mills et al. |
| 5,891,021 A | 4/1999 | Dillon et al. |
| 5,891,022 A | 4/1999 | Pologe |
| 5,891,024 A | 4/1999 | Jarman et al. |
| 5,891,025 A | 4/1999 | Buschmann et al. |
| 5,891,026 A | 4/1999 | Wang et al. |
| 5,902,235 A | 5/1999 | Lewis et al. |
| 5,910,108 A | 6/1999 | Solenberger |

| Patent | Date | Inventor |
|---|---|---|
| 5,911,690 A | 6/1999 | Rall |
| 5,912,656 A | 6/1999 | Tham et al. |
| 5,913,819 A | 6/1999 | Taylor et al. |
| 5,916,154 A | 6/1999 | Hobbs et al. |
| 5,916,155 A | 6/1999 | Levinson et al. |
| 5,919,133 A | 7/1999 | Taylor et al. |
| 5,919,134 A | 7/1999 | Diab |
| 5,920,263 A | 7/1999 | Huttenhoff et al. |
| 5,921,921 A | 7/1999 | Potratz et al. |
| 5,922,607 A | 7/1999 | Bernreuter |
| 5,924,979 A | 7/1999 | Swedlow et al. |
| 5,924,980 A | 7/1999 | Coetzee |
| 5,924,982 A | 7/1999 | Chin |
| 5,924,985 A | 7/1999 | Jones |
| 5,934,277 A | 8/1999 | Mortz |
| 5,934,925 A | 8/1999 | Tobler et al. |
| 5,940,182 A | 8/1999 | Lepper, Jr. et al. |
| 5,954,644 A | 9/1999 | Dettling et al. |
| 5,960,610 A | 10/1999 | Levinson et al. |
| 5,961,450 A | 10/1999 | Merchant et al. |
| 5,961,452 A | 10/1999 | Chung et al. |
| 5,964,701 A | 10/1999 | Asada et al. |
| 5,971,930 A | 10/1999 | Elghazzawi |
| 5,978,691 A | 11/1999 | Mills |
| 5,978,693 A | 11/1999 | Hamilton et al. |
| 5,983,122 A | 11/1999 | Jarman et al. |
| 5,987,343 A | 11/1999 | Kinast |
| 5,991,648 A | 11/1999 | Levin |
| 5,995,855 A | 11/1999 | Kiani et al. |
| 5,995,856 A | 11/1999 | Mannheimer et al. |
| 5,995,858 A | 11/1999 | Kinast |
| 5,995,859 A | 11/1999 | Takahashi |
| 5,997,343 A | 12/1999 | Mills et al. |
| 5,999,834 A | 12/1999 | Wang et al. |
| 6,002,952 A | 12/1999 | Diab et al. |
| 6,005,658 A | 12/1999 | Kaluza et al. |
| 6,006,120 A | 12/1999 | Levin |
| 6,011,985 A | 1/2000 | Athan et al. |
| 6,011,986 A | 1/2000 | Diab et al. |
| 6,014,576 A | 1/2000 | Raley et al. |
| 6,018,673 A | 1/2000 | Chin et al. |
| 6,018,674 A | 1/2000 | Aronow |
| 6,022,321 A | 2/2000 | Amano et al. |
| 6,023,541 A | 2/2000 | Merchant et al. |
| 6,026,312 A | 2/2000 | Shemwell et al. |
| 6,026,314 A | 2/2000 | Amerov et al. |
| 6,031,603 A | 2/2000 | Fine et al. |
| 6,035,223 A | 3/2000 | Baker, Jr. |
| 6,036,642 A | 3/2000 | Diab et al. |
| 6,041,247 A | 3/2000 | Weckstrom et al. |
| 6,044,283 A | 3/2000 | Fein et al. |
| 6,047,201 A | 4/2000 | Jackson, III |
| 6,061,584 A | 5/2000 | Lovejoy et al. |
| 6,064,898 A | 5/2000 | Aldrich |
| 6,064,899 A | 5/2000 | Fein et al. |
| 6,067,462 A | 5/2000 | Diab et al. |
| 6,073,038 A | 6/2000 | Wang et al. |
| 6,078,833 A | 6/2000 | Hueber |
| 6,081,735 A | 6/2000 | Diab et al. |
| 6,081,742 A | 6/2000 | Amano et al. |
| 6,083,157 A | 7/2000 | Noller |
| 6,083,172 A | 7/2000 | Baker, Jr. et al. |
| 6,088,607 A | 7/2000 | Diab et al. |
| 6,094,592 A | 7/2000 | Yorkey et al. |
| 6,095,974 A | 8/2000 | Shemwell et al. |
| 6,104,938 A | 8/2000 | Huiku et al. |
| 6,112,107 A | 8/2000 | Hannula |
| 6,113,541 A | 9/2000 | Dias et al. |
| 6,115,621 A | 9/2000 | Chin |
| 6,120,460 A | 9/2000 | Abreu |
| 6,122,535 A | 9/2000 | Kaestle et al. |
| 6,133,994 A | 10/2000 | Mathews et al. |
| 6,134,460 A | 10/2000 | Chance |
| 6,135,952 A | 10/2000 | Coetzee |
| 6,144,444 A | 11/2000 | Haworth et al. |
| 6,144,867 A | 11/2000 | Walker et al. |
| 6,144,868 A | 11/2000 | Parker |
| 6,149,481 A | 11/2000 | Wang et al. |
| 6,150,951 A | 11/2000 | Olejniczak |
| 6,151,107 A | 11/2000 | Schöllerman et al. |
| 6,151,518 A | 11/2000 | Hayashi |
| 6,152,754 A | 11/2000 | Gerhardt et al. |
| 6,154,667 A | 11/2000 | Miura et al. |
| 6,157,850 A | 12/2000 | Diab et al. |
| 6,163,715 A | 12/2000 | Larsen et al. |
| 6,165,005 A | 12/2000 | Mills et al. |
| 6,173,196 B1 | 1/2001 | Delonzor et al. |
| 6,178,343 B1 | 1/2001 | Bindszus et al. |
| 6,181,958 B1 | 1/2001 | Steuer et al. |
| 6,181,959 B1 | 1/2001 | Schöllermann et al. |
| 6,184,521 B1 | 2/2001 | Coffin, IV et al. |
| 6,188,470 B1 | 2/2001 | Grace |
| 6,192,260 B1 | 2/2001 | Chance |
| 6,195,575 B1 | 2/2001 | Levinson |
| 6,198,951 B1 | 3/2001 | Kosuda et al. |
| 6,206,830 B1 | 3/2001 | Diab et al. |
| 6,213,952 B1 | 4/2001 | Finarov et al. |
| 6,217,523 B1 | 4/2001 | Amano et al. |
| 6,222,189 B1 | 4/2001 | Misner et al. |
| 6,226,539 B1 | 5/2001 | Potratz |
| 6,226,540 B1 | 5/2001 | Bernreuter et al. |
| 6,229,856 B1 | 5/2001 | Diab et al. |
| 6,230,035 B1 | 5/2001 | Aoyagi et al. |
| 6,233,470 B1 | 5/2001 | Tsuchiya |
| 6,236,871 B1 | 5/2001 | Tsuchiya |
| 6,236,872 B1 | 5/2001 | Diab et al. |
| 6,240,305 B1 | 5/2001 | Tsuchiya |
| 6,253,097 B1 | 6/2001 | Aronow et al. |
| 6,253,098 B1 | 6/2001 | Walker et al. |
| 6,256,523 B1 | 7/2001 | Diab et al. |
| 6,256,524 B1 | 7/2001 | Walker et al. |
| 6,261,236 B1 | 7/2001 | Grimblatov |
| 6,263,221 B1 | 7/2001 | Chance et al. |
| 6,263,222 B1 | 7/2001 | Diab et al. |
| 6,263,223 B1 | 7/2001 | Sheperd et al. |
| 6,266,546 B1 | 7/2001 | Steuer et al. |
| 6,266,547 B1 | 7/2001 | Walker et al. |
| 6,272,363 B1 | 8/2001 | Casciani et al. |
| 6,278,522 B1 | 8/2001 | Lepper, Jr. et al. |
| 6,280,213 B1 | 8/2001 | Tobler et al. |
| 6,280,381 B1 | 8/2001 | Malin et al. |
| 6,285,894 B1 | 9/2001 | Oppelt et al. |
| 6,285,895 B1 | 9/2001 | Ristolainen et al. |
| 6,285,896 B1 | 9/2001 | Tobler et al. |
| 6,298,252 B1 | 10/2001 | Kovach et al. |
| 6,308,089 B1 | 10/2001 | Von der Ruhr et al. |
| 6,312,393 B1 | 11/2001 | Abreu |
| 6,321,100 B1 | 11/2001 | Parker |
| 6,330,468 B1 | 12/2001 | Scharf |
| 6,334,065 B1 | 12/2001 | Al-Ali et al. |
| 6,339,715 B1 | 1/2002 | Bahr et al. |
| 6,343,223 B1 | 1/2002 | Chin et al. |
| 6,343,224 B1 | 1/2002 | Parker |
| 6,349,228 B1 | 2/2002 | Kiani et al. |
| 6,351,658 B1 | 2/2002 | Middleman et al. |
| 6,353,750 B1 | 3/2002 | Kimura et al. |
| 6,356,774 B1 | 3/2002 | Bernstein et al. |
| 6,360,113 B1 | 3/2002 | Dettling |
| 6,360,114 B1 | 3/2002 | Diab et al. |
| 6,361,501 B1 | 3/2002 | Amano et al. |
| 6,363,269 B1 | 3/2002 | Hanna et al. |
| 6,370,408 B1 | 4/2002 | Merchant et al. |
| 6,370,409 B1 | 4/2002 | Chung et al. |
| 6,374,129 B1 | 4/2002 | Chin et al. |
| 6,377,829 B1 | 4/2002 | Al-Ali et al. |
| 6,381,479 B1 | 4/2002 | Norris |
| 6,381,480 B1 | 4/2002 | Stoddar et al. |
| 6,385,471 B1 | 5/2002 | Mortz |
| 6,385,821 B1 | 5/2002 | Modgil et al. |
| 6,388,240 B2 | 5/2002 | Schulz et al. |
| 6,393,310 B1 | 5/2002 | Kuenster |
| 6,397,091 B2 | 5/2002 | Diab et al. |
| 6,397,092 B1 | 5/2002 | Norris et al. |
| 6,397,093 B1 | 5/2002 | Aldrich |
| 6,400,971 B1 | 6/2002 | Finarov et al. |
| 6,400,972 B1 | 6/2002 | Fine |
| 6,402,690 B1 | 6/2002 | Rhee et al. |
| 6,408,198 B1 | 6/2002 | Hanna et al. |

| Patent No. | Date | Inventor |
|---|---|---|
| 6,411,832 B1 | 6/2002 | Guthermann |
| 6,411,833 B1 | 6/2002 | Baker, Jr. et al. |
| 6,415,236 B2 | 7/2002 | Kobayashi et al. |
| 6,419,671 B1 | 7/2002 | Lemberg |
| 6,421,549 B1 | 7/2002 | Jacques |
| 6,430,423 B2 | 8/2002 | DeLonzor et al. |
| 6,430,513 B1 | 8/2002 | Wang et al. |
| 6,430,525 B1 | 8/2002 | Weber et al. |
| 6,434,408 B1 | 8/2002 | Heckel et al. |
| 6,438,399 B1 | 8/2002 | Kurth |
| 6,449,501 B1 | 9/2002 | Reuss |
| 6,453,183 B1 | 9/2002 | Walker |
| 6,453,184 B1 | 9/2002 | Hyogo et al. |
| 6,456,862 B2 | 9/2002 | Benni |
| 6,461,305 B1 | 10/2002 | Schnall |
| 6,463,310 B1 | 10/2002 | Swedlow et al. |
| 6,463,311 B1 | 10/2002 | Diab |
| 6,466,808 B1 | 10/2002 | Chin et al. |
| 6,466,809 B1 | 10/2002 | Riley |
| 6,470,199 B1 | 10/2002 | Kopotic et al. |
| 6,470,200 B2 | 10/2002 | Walker et al. |
| 6,480,729 B2 | 11/2002 | Stone |
| 6,487,439 B1 | 11/2002 | Skladnev et al. |
| 6,490,466 B1 | 12/2002 | Fein et al. |
| 6,496,711 B1 | 12/2002 | Athan et al. |
| 6,498,942 B1 | 12/2002 | Esenaliev et al. |
| 6,501,974 B2 | 12/2002 | Huiku |
| 6,501,975 B2 | 12/2002 | Diab et al. |
| 6,505,060 B1 | 1/2003 | Norris |
| 6,505,061 B2 | 1/2003 | Larson |
| 6,505,133 B1 | 1/2003 | Hanna et al. |
| 6,510,329 B2 | 1/2003 | Heckel |
| 6,510,331 B1 | 1/2003 | Williams et al. |
| 6,512,937 B2 | 1/2003 | Blank et al. |
| 6,515,273 B2 | 2/2003 | Al-Ali |
| 6,519,484 B1 | 2/2003 | Lovejoy et al. |
| 6,519,486 B1 | 2/2003 | Edgar, Jr. et al. |
| 6,519,487 B1 | 2/2003 | Parker |
| 6,525,386 B1 | 2/2003 | Mills et al. |
| 6,526,300 B1 | 2/2003 | Kiani et al. |
| 6,526,301 B2 | 2/2003 | Larsen et al. |
| 6,541,756 B2 | 4/2003 | Schulz et al. |
| 6,542,764 B1 | 4/2003 | Al-Ali et al. |
| 6,544,193 B2 | 4/2003 | Abreu |
| 6,546,267 B1 | 4/2003 | Sugiura et al. |
| 6,549,795 B1 | 4/2003 | Chance |
| 6,553,241 B2 | 4/2003 | Mannheimer et al. |
| 6,553,242 B1 | 4/2003 | Sarussi |
| 6,553,243 B2 | 4/2003 | Gurley |
| 6,556,852 B1 | 4/2003 | Schulze et al. |
| 6,560,470 B1 | 5/2003 | Pologe |
| 6,564,077 B2 | 5/2003 | Mortara |
| 6,564,088 B1 | 5/2003 | Soller et al. |
| 6,571,113 B1 | 5/2003 | Fein et al. |
| 6,571,114 B1 | 5/2003 | Koike et al. |
| 6,574,491 B2 | 6/2003 | Elghazzawi |
| 6,580,086 B1 | 6/2003 | Schulz et al. |
| 6,584,336 B1 | 6/2003 | Ali et al. |
| 6,587,703 B2 | 7/2003 | Cheng et al. |
| 6,587,704 B1 | 7/2003 | Fine et al. |
| 6,589,172 B2 | 7/2003 | Williams et al. |
| 6,591,122 B2 | 7/2003 | Schmitt |
| 6,591,123 B2 | 7/2003 | Fein et al. |
| 6,594,511 B2 | 7/2003 | Stone et al. |
| 6,594,512 B2 | 7/2003 | Huang |
| 6,594,513 B1 | 7/2003 | Jobsis et al. |
| 6,597,931 B1 | 7/2003 | Cheng et al. |
| 6,597,933 B2 | 7/2003 | Kiani et al. |
| 6,600,940 B1 | 7/2003 | Fein et al. |
| 6,606,509 B2 | 8/2003 | Schmitt |
| 6,606,510 B2 | 8/2003 | Swedlow et al. |
| 6,606,511 B1 | 8/2003 | Ali et al. |
| 6,606,512 B2 | 8/2003 | Muz et al. |
| 6,615,064 B1 | 9/2003 | Aldrich |
| 6,615,065 B1 | 9/2003 | Barrett et al. |
| 6,618,602 B2 | 9/2003 | Levin et al. |
| 6,622,034 B1 | 9/2003 | Gorski et al. |
| 6,622,095 B2 | 9/2003 | Kobayashi et al. |
| 6,628,975 B1 | 9/2003 | Fein et al. |
| 6,631,281 B1 | 10/2003 | Kästle |
| 6,643,530 B2 | 11/2003 | Diab et al. |
| 6,643,531 B1 | 11/2003 | Katarow |
| 6,647,279 B2 | 11/2003 | Pologe |
| 6,647,280 B2 | 11/2003 | Bahr et al. |
| 6,650,917 B2 | 11/2003 | Diab et al. |
| 6,650,918 B2 | 11/2003 | Terry |
| 6,654,621 B2 | 11/2003 | Palatnik et al. |
| 6,654,622 B1 | 11/2003 | Eberhard et al. |
| 6,654,623 B1 | 11/2003 | Kästle |
| 6,654,624 B2 | 11/2003 | Diab et al. |
| 6,658,276 B2 | 12/2003 | Kianl et al. |
| 6,658,277 B2 | 12/2003 | Wasserman |
| 6,662,030 B2 | 12/2003 | Khalil et al. |
| 6,662,033 B2 | 12/2003 | Casciani et al. |
| 6,665,551 B1 | 12/2003 | Suzuki |
| 6,668,182 B2 | 12/2003 | Hubelbank |
| 6,668,183 B2 | 12/2003 | Hicks et al. |
| 6,671,526 B1 | 12/2003 | Aoyagi et al. |
| 6,671,528 B2 | 12/2003 | Steuer et al. |
| 6,671,530 B2 | 12/2003 | Chung et al. |
| 6,671,531 B2 | 12/2003 | Al-Ali et al. |
| 6,671,532 B1 | 12/2003 | Fudge et al. |
| 6,675,031 B1 | 1/2004 | Porges et al. |
| 6,678,543 B2 | 1/2004 | Diab et al. |
| 6,681,126 B2 | 1/2004 | Solenberger |
| 6,681,128 B2 | 1/2004 | Steuer et al. |
| 6,681,454 B2 | 1/2004 | Modgil et al. |
| 6,684,090 B2 | 1/2004 | Ali et al. |
| 6,684,091 B2 | 1/2004 | Parker |
| 6,690,958 B1 | 2/2004 | Walker et al. |
| 6,694,160 B2 | 2/2004 | Chin |
| 6,697,653 B2 | 2/2004 | Hanna |
| 6,697,655 B2 | 2/2004 | Sueppel et al. |
| 6,697,656 B1 | 2/2004 | Al-Ali |
| 6,697,658 B2 | 2/2004 | Al-Ali |
| RE038,476 E | 3/2004 | Diab et al. |
| 6,699,194 B1 | 3/2004 | Diab et al. |
| 6,699,199 B2 | 3/2004 | Asada et al. |
| 6,701,170 B2 | 3/2004 | Stetson |
| 6,702,752 B2 | 3/2004 | Dekker |
| 6,707,257 B2 | 3/2004 | Norris |
| 6,708,048 B1 | 3/2004 | Chance |
| 6,708,049 B1 | 3/2004 | Berson et al. |
| 6,709,402 B2 | 3/2004 | Dekker |
| 6,711,424 B1 | 3/2004 | Fine et al. |
| 6,711,425 B1 | 3/2004 | Reuss |
| 6,714,803 B1 | 3/2004 | Mortz |
| 6,714,804 B2 | 3/2004 | Al-Ali et al. |
| 6,714,805 B2 | 3/2004 | Jeon et al. |
| RE038,492 E | 4/2004 | Diab et al. |
| 6,719,686 B2 | 4/2004 | Coakley et al. |
| 6,719,705 B2 | 4/2004 | Mills |
| 6,720,734 B2 | 4/2004 | Norris |
| 6,721,584 B2 | 4/2004 | Baker, Jr. et al. |
| 6,721,585 B1 | 4/2004 | Parker |
| 6,725,074 B1 | 4/2004 | Kästle |
| 6,725,075 B2 | 4/2004 | Al-Ali |
| 6,731,963 B2 | 5/2004 | Finarov et al. |
| 6,731,967 B1 | 5/2004 | Turcott |
| 6,735,459 B2 | 5/2004 | Parker |
| 6,745,060 B2 | 6/2004 | Diab et al. |
| 6,745,061 B1 | 6/2004 | Hicks et al. |
| 6,748,253 B2 | 6/2004 | Norris et al. |
| 6,748,254 B2 | 6/2004 | O'Neill et al. |
| 6,754,515 B1 | 6/2004 | Pologe |
| 6,754,516 B2 | 6/2004 | Mannheimer |
| 6,760,607 B2 | 7/2004 | Al-Ali |
| 6,760,609 B2 | 7/2004 | Jacques |
| 6,760,610 B2 | 7/2004 | Tscupp et al. |
| 6,763,255 B2 | 7/2004 | DeLonzor et al. |
| 6,763,256 B2 | 7/2004 | Kimball et al. |
| 6,770,028 B1 | 8/2004 | Ali et al. |
| 6,771,994 B2 | 8/2004 | Kiani et al. |
| 6,773,397 B2 | 8/2004 | Kelly |
| 6,778,923 B2 | 8/2004 | Norris et al. |
| 6,780,158 B2 | 8/2004 | Yarita |
| 6,785,568 B2 | 8/2004 | Chance |
| 6,792,300 B1 | 9/2004 | Diab et al. |

| Patent | Kind | Date | Name |
|---|---|---|---|
| 6,793,654 | B2 | 9/2004 | Lemberg |
| 6,801,797 | B2 | 10/2004 | Mannheimer et al. |
| 6,801,798 | B2 | 10/2004 | Geddes et al. |
| 6,801,799 | B2 | 10/2004 | Mendelson |
| 6,801,802 | B2 | 10/2004 | Sitzman et al. |
| 6,802,812 | B1 | 10/2004 | Walker et al. |
| 6,805,673 | B2 | 10/2004 | Dekker |
| 6,810,277 | B2 | 10/2004 | Edgar, Jr. et al. |
| 6,813,511 | B2 | 11/2004 | Diab et al. |
| 6,816,741 | B2 | 11/2004 | Diab |
| 6,819,950 | B2 | 11/2004 | Mills |
| 6,822,564 | B2 | 11/2004 | Al-Ali |
| 6,825,619 | B2 | 11/2004 | Norris |
| 6,826,419 | B2 | 11/2004 | Diab et al. |
| 6,829,496 | B2 | 12/2004 | Nagai et al. |
| 6,830,711 | B2 | 12/2004 | Mills et al. |
| 6,836,679 | B2 | 12/2004 | Baker, Jr. et al. |
| 6,839,579 | B1 | 1/2005 | Chin |
| 6,839,580 | B2 | 1/2005 | Zonios et al. |
| 6,839,582 | B2 | 1/2005 | Heckel |
| 6,839,659 | B2 | 1/2005 | Tarassenko et al. |
| 6,842,635 | B1 | 1/2005 | Parker |
| 6,845,256 | B2 | 1/2005 | Chin et al. |
| 6,850,787 | B2 | 2/2005 | Weber et al. |
| 6,850,788 | B2 | 2/2005 | Al-Ali |
| 6,850,789 | B2 | 2/2005 | Schweitzer, Jr. et al. |
| 6,861,639 | B2 | 3/2005 | Al-Ali |
| 6,863,652 | B2 | 3/2005 | Huang et al. |
| 6,865,407 | B2 | 3/2005 | Kimball et al. |
| 6,873,865 | B2 | 3/2005 | Steuer et al. |
| 6,879,850 | B2 | 4/2005 | Kimball |
| 6,882,874 | B2 | 4/2005 | Huiku |
| 6,889,153 | B2 | 5/2005 | Dietiker |
| 6,898,452 | B2 | 5/2005 | Al-Ali et al. |
| 6,909,912 | B2 | 6/2005 | Melker et al. |
| 6,912,413 | B2 | 6/2005 | Rantala et al. |
| 6,916,289 | B2 | 7/2005 | Schnall |
| 6,920,345 | B2 | 7/2005 | Al-Ali et al. |
| 6,931,269 | B2 | 8/2005 | Terry |
| 6,934,570 | B2 | 8/2005 | Kiani et al. |
| 6,939,307 | B1 | 9/2005 | Dunlop |
| 6,941,162 | B2 | 9/2005 | Fudge et al. |
| 6,947,781 | B2 | 9/2005 | Asada et al. |
| 6,949,081 | B1 | 9/2005 | Chance |
| 6,950,687 | B2 | 9/2005 | Al-Ali |
| 6,961,598 | B2 | 11/2005 | Diab |
| 6,963,767 | B2 | 11/2005 | Rantala et al. |
| 6,971,580 | B2 | 12/2005 | Zhu et al. |
| 6,983,178 | B2 | 1/2006 | Fine et al. |
| 6,985,763 | B2 | 1/2006 | Boas et al. |
| 6,985,764 | B2 | 1/2006 | Mason et al. |
| 6,990,426 | B2 | 1/2006 | Yoon et al. |
| 6,992,751 | B2 | 1/2006 | Okita et al. |
| 6,992,772 | B2 | 1/2006 | Block et al. |
| 6,993,371 | B2 | 1/2006 | Kiani et al. |
| 6,993,372 | B2 | 1/2006 | Fine et al. |
| 6,996,427 | B2 | 2/2006 | Ali et al. |
| 7,003,338 | B2 | 2/2006 | Weber et al. |
| 7,003,339 | B2 | 2/2006 | Diab et al. |
| 7,006,855 | B1 | 2/2006 | Sarussi |
| 7,006,856 | B2 | 2/2006 | Baker, Jr. et al. |
| 7,016,715 | B2 | 3/2006 | Stetson |
| 7,020,507 | B2 | 3/2006 | Scharf et al. |
| 7,024,233 | B2 | 4/2006 | Ali et al. |
| 7,024,235 | B2 | 4/2006 | Melker et al. |
| 7,025,728 | B2 | 4/2006 | Ito et al. |
| 7,027,849 | B2 | 4/2006 | Al-Ali et al. |
| 7,027,850 | B2 | 4/2006 | Wasserman |
| 7,035,697 | B1 | 4/2006 | Brown |
| 7,039,449 | B2 | 5/2006 | Al-Ali |
| 7,043,289 | B2 | 5/2006 | Fine et al. |
| 7,047,055 | B2 | 5/2006 | Boaz et al. |
| 7,047,056 | B2 | 5/2006 | Hannula et al. |
| 7,060,035 | B2 | 6/2006 | Wasserman et al. |
| 7,062,307 | B2 | 6/2006 | Norris et al. |
| 7,067,893 | B2 | 6/2006 | Mills et al. |
| 7,072,701 | B2 | 7/2006 | Chen et al. |
| 7,072,702 | B2 | 7/2006 | Edgar, Jr. et al. |
| 7,079,880 | B2 | 7/2006 | Stetson |
| 7,085,597 | B2 | 8/2006 | Fein et al. |
| 7,096,054 | B2 | 8/2006 | Abdul-Hafiz et al. |
| 7,107,088 | B2 | 9/2006 | Aceti |
| 7,113,815 | B2 | 9/2006 | O'Neil et al. |
| 7,123,950 | B2 | 10/2006 | Mannheimer |
| 7,127,278 | B2 | 10/2006 | Melker et al. |
| 7,130,671 | B2 | 10/2006 | Baker, Jr. et al. |
| 7,132,641 | B2 | 11/2006 | Schulz et al. |
| 7,133,711 | B2 | 11/2006 | Chernoguz et al. |
| 7,139,559 | B2 | 11/2006 | Terry et al. |
| 7,142,901 | B2 | 11/2006 | Kiani et al. |
| 7,162,288 | B2 | 1/2007 | Nordstrom |
| 7,190,987 | B2 | 3/2007 | Lindekugel et al. |
| 7,198,778 | B2 | 4/2007 | Achilefu et al. |
| 7,209,775 | B2 | 4/2007 | Bae et al. |
| 7,215,984 | B2 | 5/2007 | Diab et al. |
| 7,225,006 | B2 | 5/2007 | Al-Ali et al. |
| 7,236,811 | B2 | 6/2007 | Schmitt |
| 7,248,910 | B2 | 7/2007 | Li et al. |
| 7,254,433 | B2 | 8/2007 | Diab et al. |
| 7,254,434 | B2 | 8/2007 | Schulz et al. |
| 7,263,395 | B2 | 8/2007 | Chan et al. |
| 7,272,426 | B2 | 9/2007 | Scmid |
| 7,280,858 | B2 | 10/2007 | Al-Ali et al. |
| 7,295,866 | B2 | 11/2007 | Al-Ali et al. |
| 7,305,262 | B2 | 12/2007 | Brodnick et al. |
| 7,315,753 | B2 | 1/2008 | Baker, Jr. et al. |
| 2001/0005773 | A1 | 6/2001 | Larsen et al. |
| 2001/0020122 | A1 | 9/2001 | Steuer et al. |
| 2001/0021803 | A1 | 9/2001 | Blank et al. |
| 2001/0039376 | A1 | 11/2001 | Steuer et al. |
| 2001/0044700 | A1 | 11/2001 | Kobayashi et al. |
| 2001/0051767 | A1 | 12/2001 | Williams et al. |
| 2002/0026106 | A1 | 2/2002 | Khalil et al. |
| 2002/0026109 | A1 | 2/2002 | Diab et al. |
| 2002/0028990 | A1 | 3/2002 | Sheperd et al. |
| 2002/0035318 | A1 | 3/2002 | Mannheimer et al. |
| 2002/0038078 | A1 | 3/2002 | Ito |
| 2002/0038079 | A1 | 3/2002 | Steuer et al. |
| 2002/0042558 | A1 | 4/2002 | Mendelson |
| 2002/0049389 | A1 | 4/2002 | Abreu |
| 2002/0062071 | A1 | 5/2002 | Diab et al. |
| 2002/0068859 | A1 | 6/2002 | Knopp |
| 2002/0111748 | A1 | 8/2002 | Kobayashi et al. |
| 2002/0128544 | A1 | 9/2002 | Diab et al. |
| 2002/0133067 | A1 | 9/2002 | Jackson, III |
| 2002/0133068 | A1 | 9/2002 | Huiku |
| 2002/0156354 | A1 | 10/2002 | Larson |
| 2002/0161287 | A1 | 10/2002 | Schmitt |
| 2002/0161290 | A1 | 10/2002 | Chance |
| 2002/0165439 | A1 | 11/2002 | Schmitt |
| 2002/0173706 | A1 | 11/2002 | Takatani |
| 2002/0173709 | A1 | 11/2002 | Fine et al. |
| 2002/0190863 | A1 | 12/2002 | Lynn |
| 2002/0198442 | A1 | 12/2002 | Rantala et al. |
| 2002/0198443 | A1 | 12/2002 | Ting |
| 2003/0018243 | A1 | 1/2003 | Gerhardt et al. |
| 2003/0023140 | A1 | 1/2003 | Chance |
| 2003/0036690 | A1 | 2/2003 | Geddes et al. |
| 2003/0045785 | A1 | 3/2003 | Diab et al. |
| 2003/0055324 | A1 | 3/2003 | Wasserman |
| 2003/0060693 | A1 | 3/2003 | Monfre et al. |
| 2003/0073889 | A1 | 4/2003 | Keilbach et al. |
| 2003/0073890 | A1 | 4/2003 | Hanna |
| 2003/0100840 | A1 | 5/2003 | Sugiura et al. |
| 2003/0132495 | A1 | 7/2003 | Mills et al. |
| 2003/0135099 | A1 | 7/2003 | Al-Ali |
| 2003/0139687 | A1 | 7/2003 | Abreu |
| 2003/0144584 | A1 | 7/2003 | Mendelson |
| 2003/0162414 | A1 | 8/2003 | Schulz et al. |
| 2003/0171662 | A1 | 9/2003 | O'Connor et al. |
| 2003/0176776 | A1 | 9/2003 | Huiku |
| 2003/0181799 | A1 | 9/2003 | Lindekugel et al. |
| 2003/0187337 | A1 | 10/2003 | Tarassenko et al. |
| 2003/0195402 | A1 | 10/2003 | Fein et al. |
| 2003/0197679 | A1 | 10/2003 | Ali et al. |
| 2003/0212316 | A1 | 11/2003 | Leiden et al. |
| 2003/0220548 | A1 | 11/2003 | Schmitt |
| 2003/0220576 | A1 | 11/2003 | Diab |

| | | | | | | |
|---|---|---|---|---|---|---|
| 2003/0225323 | A1 | 12/2003 | Kiani et al. | 2005/0080323 A1 | 4/2005 | Kato |
| 2003/0225337 | A1 | 12/2003 | Scharf et al. | 2005/0101850 A1 | 5/2005 | Parker |
| 2003/0236452 | A1 | 12/2003 | Melker et al. | 2005/0113656 A1 | 5/2005 | Chance |
| 2003/0236647 | A1 | 12/2003 | Yoon et al. | 2005/0168722 A1 | 8/2005 | Forstner et al. |
| 2004/0006261 | A1 | 1/2004 | Swedlow et al. | 2005/0177034 A1 | 8/2005 | Beaumont |
| 2004/0010188 | A1 | 1/2004 | Wasserman et al. | 2005/0192488 A1 | 9/2005 | Bryenton et al. |
| 2004/0024297 | A1 | 2/2004 | Chen et al. | 2005/0197548 A1 | 9/2005 | Dietiker |
| 2004/0024326 | A1 | 2/2004 | Yeo et al. | 2005/0203357 A1 | 9/2005 | Debreczeny et al. |
| 2004/0034293 | A1 | 2/2004 | Kimball | 2005/0228248 A1 | 10/2005 | Dietiker |
| 2004/0039272 | A1 | 2/2004 | Abdul-Hafiz et al. | 2005/0267346 A1 | 12/2005 | Faber et al. |
| 2004/0039273 | A1 | 2/2004 | Terry | 2005/0277819 A1 | 12/2005 | Kiani et al. |
| 2004/0054269 | A1 | 3/2004 | Rantala et al. | 2005/0283059 A1 | 12/2005 | Iyer et al. |
| 2004/0054270 | A1 | 3/2004 | Pewzner et al. | 2006/0009688 A1 | 1/2006 | Lamego et al. |
| 2004/0054291 | A1 | 3/2004 | Schulz et al. | 2006/0015021 A1 | 1/2006 | Cheng |
| 2004/0059209 | A1 | 3/2004 | Al-Ali et al. | 2006/0020181 A1 | 1/2006 | Schmitt |
| 2004/0059210 | A1 | 3/2004 | Stetson | 2006/0025660 A1 | 2/2006 | Swedlow et al. |
| 2004/0064020 | A1 | 4/2004 | Diab et al. | 2006/0030763 A1 | 2/2006 | Mannheimer et al. |
| 2004/0068164 | A1 | 4/2004 | Diab et al. | 2006/0052680 A1 | 3/2006 | Diab |
| 2004/0087846 | A1 | 5/2004 | Wasserman | 2006/0058594 A1 | 3/2006 | Ishizuka et al. |
| 2004/0092805 | A1 | 5/2004 | Yarita | 2006/0058683 A1 | 3/2006 | Chance |
| 2004/0097797 | A1 | 5/2004 | Porges et al. | 2006/0064024 A1 | 3/2006 | Schnall |
| 2004/0098009 | A1 | 5/2004 | Boecker et al. | 2006/0084852 A1 | 4/2006 | Mason et al. |
| 2004/0107065 | A1 | 6/2004 | Al-Ali et al. | 2006/0089547 A1 | 4/2006 | Sarussi |
| 2004/0116788 | A1 | 6/2004 | Chernoguz et al. | 2006/0106294 A1 | 5/2006 | Maser et al. |
| 2004/0116789 | A1 | 6/2004 | Boaz et al. | 2006/0195028 A1 | 8/2006 | Hannula et al. |
| 2004/0117891 | A1 | 6/2004 | Hannula et al. | 2006/0224058 A1 | 10/2006 | Mannheimer |
| 2004/0122300 | A1 | 6/2004 | Boas et al. | 2006/0247501 A1 | 11/2006 | Ali |
| 2004/0122302 | A1 | 6/2004 | Mason et al. | 2006/0258921 A1 | 11/2006 | Addison et al. |
| 2004/0127779 | A1 | 7/2004 | Steuer et al. | 2006/0270920 A1 | 11/2006 | Al-Ali et al. |
| 2004/0133087 | A1 | 7/2004 | Ali et al. | 2007/0032710 A1 | 2/2007 | Raridan et al. |
| 2004/0133088 | A1 | 7/2004 | Al-Ali et al. | 2007/0032712 A1 | 2/2007 | Raridan et al. |
| 2004/0138538 | A1 | 7/2004 | Stetson | 2007/0032715 A1 | 2/2007 | Eghbal et al. |
| 2004/0138540 | A1 | 7/2004 | Baker, Jr. et al. | 2007/0073126 A1 | 3/2007 | Raridan, Jr. |
| 2004/0143172 | A1 | 7/2004 | Fudge et al. | | | |
| 2004/0147821 | A1 | 7/2004 | Al-Ali et al. | | | |

FOREIGN PATENT DOCUMENTS

| | | |
|---|---|---|
| DE | 19640807 | 9/1997 |
| EP | 0127947 | 12/1984 |
| EP | 1491135 | 12/2004 |
| FR | 2685865 | 1/1992 |
| JP | 4191642 | 7/1992 |
| JP | 7001273 | 1/1995 |
| JP | 10216115 | 8/1998 |
| JP | 2003194714 | 7/2003 |
| JP | 2003210438 | 7/2003 |
| JP | 2003275192 | 9/2003 |
| JP | 2004089546 | 3/2004 |
| JP | 2004248819 | 9/2004 |
| WO | WO9221281 | 12/1992 |
| WO | WO9309711 | 5/1993 |
| WO | WO9316629 | 9/1993 |
| WO | WO9403102 | 2/1994 |
| WO | WO9502358 | 1/1995 |
| WO | WO9512349 | 5/1995 |
| WO | WO9749330 | 12/1997 |
| WO | WO02062213 | 8/2002 |
| WO | WO2005009221 | 2/2005 |
| WO | WO2005010567 | 2/2005 |

| | | | | | | |
|---|---|---|---|---|---|---|
| 2004/0147822 | A1 | 7/2004 | Al-Ali et al. | | | |
| 2004/0147823 | A1 | 7/2004 | Kiani et al. | | | |
| 2004/0147824 | A1 | 7/2004 | Diab et al. | | | |
| 2004/0152965 | A1 | 8/2004 | Diab et al. | | | |
| 2004/0158134 | A1 | 8/2004 | Diab et al. | | | |
| 2004/0158135 | A1 | 8/2004 | Baker, Jr. et al. | | | |
| 2004/0162472 | A1 | 8/2004 | Berson et al. | | | |
| 2004/0171920 | A1 | 9/2004 | Mannheimer et al. | | | |
| 2004/0171948 | A1 | 9/2004 | Terry | | | |
| 2004/0176670 | A1 | 9/2004 | Takamura et al. | | | |
| 2004/0176671 | A1 | 9/2004 | Fine et al. | | | |
| 2004/0181133 | A1 | 9/2004 | Al-Ali et al. | | | |
| 2004/0181134 | A1 | 9/2004 | Baker, Jr. et al. | | | |
| 2004/0186358 | A1 | 9/2004 | Chernow et al. | | | |
| 2004/0199063 | A1 | 10/2004 | O'Neil et al. | | | |
| 2004/0204636 | A1 | 10/2004 | Diab et al. | | | |
| 2004/0204637 | A1 | 10/2004 | Diab et al. | | | |
| 2004/0204638 | A1 | 10/2004 | Diab et al. | | | |
| 2004/0204639 | A1 | 10/2004 | Casciani et al. | | | |
| 2004/0204865 | A1 | 10/2004 | Lee et al. | | | |
| 2004/0210146 | A1 | 10/2004 | Diab et al. | | | |
| 2004/0215069 | A1 | 10/2004 | Mannheimer | | | |
| 2004/0230106 | A1 | 11/2004 | Schmitt et al. | | | |
| 2004/0230107 | A1 | 11/2004 | Asada et al. | | | |
| 2004/0230108 | A1 | 11/2004 | Melker et al. | | | |
| 2004/0236196 | A1 | 11/2004 | Diab et al. | | | |
| 2004/0242980 | A1 | 12/2004 | Kiani et al. | | | |
| 2004/0249252 | A1 | 12/2004 | Fine et al. | | | |
| 2004/0257557 | A1 | 12/2004 | Block et al. | | | |
| 2004/0260161 | A1 | 12/2004 | Melker et al. | | | |
| 2004/0267103 | A1 | 12/2004 | Li et al. | | | |
| 2004/0267104 | A1 | 12/2004 | Hannula et al. | | | |
| 2004/0267140 | A1 | 12/2004 | Ito et al. | | | |
| 2005/0004479 | A1 | 1/2005 | Townsend et al. | | | |
| 2005/0010092 | A1 | 1/2005 | Weber et al. | | | |
| 2005/0020887 | A1 | 1/2005 | Goldberg | | | |
| 2005/0020894 | A1 | 1/2005 | Norris et al. | | | |
| 2005/0033128 | A1 | 2/2005 | Ali et al. | | | |
| 2005/0033129 | A1 | 2/2005 | Edgar, Jr. et al. | | | |
| 2005/0043599 | A1 | 2/2005 | O'Mara | | | |
| 2005/0043600 | A1 | 2/2005 | Diab et al. | | | |
| 2005/0049470 | A1 | 3/2005 | Terry | | | |
| 2005/0049471 | A1 | 3/2005 | Aceti | | | |
| 2005/0075550 | A1 | 4/2005 | Lindekugel | | | |

OTHER PUBLICATIONS

Ikeda, Kenji, et al.; "Improvement of Photo-Electric Plethysmograph Applying Newly Developed Opto-Electronic Devices," IEEE Tencon, pp. 1109-1112 (1999).

Yang, Boo-Ho, et al.; "Development of the ring sensor for healthcare automation," *Robotics and Autonomous Systems*, vol. 30, pp. 273-281 (2000).

Rhee, Sokwoo, et al.; "Artifact-Resistant, Power-Efficient Design of Finger-Ring Plethysmographic Sensor—Part I: Design and Analysis," *Proceedings of the 22nd Annual EMBS International Conference*, Chicago, Illinois; Jul. 23-28, 2000; pp. 2792-2795.

Aoyagi, T., et al.; "Pulse Oximeters: background, present and future," Neonatal Care, vol. 13, No. 7, pp. 21-27 (2000) (Article in Japanese—contains English summary of article).

Cysewska-Sobusaik, Anna; "Metrological Problems With noninvasive Transillumination of Living Tissues," *Proceedings of SPIE*, vol. 4515, pp. 15-24 (2001).

Rhee, Sokwoo, et al.; "Artifact-Resistant, Power-Efficient Design of Finger-Ring Plethysmographic Sensor," *IEEE Transactions on Biomedical Engineering*, vol. 48, No. 7, pp. 795-805 (Jul. 2001).

Lopez-Silva, Sonnia Maria Lopez, et al.; "NIR transmittance pulse oximetry system with laser diodes," *Clinical Diagnostic Systems, Proceedings of SPIE*, vol. 4255, pp. 80-87 (2001).

Maletras, Francois-Xavier, et al.; "Construction and calibration of a new design of Fiber Optic Respiratory Plethysmograph (FORP)," *Optomechanical Design and Engineering, Proceedings of SPIE*, vol. 4444, pp. 285-293 (2001).

Relente, A.R., et al.; "Characterization and Adaptive Filtering of Motion Artifacts in Pulse Oximetry using Accelerometers," *Proceedings of the Second joint EMBS/BMES Conference*, Houston, Texas, Oct. 23-26, 2002; pp. 1769-1770.

Tobata, H., et al.; "Study of Ambient Light Affecting Pulse Oximeter Probes," *Ikigaku (Medical Technology)*, vol. 71, No. 10, pp. 475-476 (2002) (Article in Japanese—contains English summary of article).

Shaltis, Phillip, et al.; "Implementation and Validation of a Power-Efficient, High-Speed Modulation Design for Wireless Oxygen Saturation Measurement Systems," *IEEE*, pp. 193-194 (2002).

Cyrill, D., et al.; "Adaptive Comb Filter for Quasi-Periodic Physiologic Signals," *Proceedings of the 25th Annual International Conference of the IEEE EMBS*, Cancun, Mexico, Sep. 17-21, 2003; pp. 2439-2442.

Aoyagi, Takuo; "Pulse oximetry: its invention, theory, and future," *Journal of Anesthesia*, vol. 17, pp. 259-266 (2003).

Itoh, K., et al.; "Pulse Oximeter," *Toyaku Zasshi* (Toyaku Journal), vol. 25, No. 8, pp. 50-54 (2003) (Article in Japanese—contains English summary of article).

Johnston, William S., et al.; "Effects of Motion Artifacts on helmet-Mounted Pulse Oximeter Sensors," 2 pgs. (2004).

Matsuzawa, Y., et al.; "Pulse Oximeter," *Home Care Medicine*, pp. 42-45 (Jul. 2004); (Article in Japanese—contains English summary of article).

Odagiri, Y.; "Pulse Wave Measuring Device," *Micromechatronics*, vol. 42, No. 3, pp. 6-11 (undated) (Article in Japanese—contains English summary of article).

WAVELENGTH SELECTION AND OUTLIER DETECTION IN REDUCED RANK LINEAR MODELS

RELATED APPLICATIONS

This application claims priority to U.S. Provisional Application No. 61/072,601, filed Mar. 31, 2008, and is incorporated herein by reference in its entirety.

BACKGROUND

The present disclosure relates generally to selecting useful predictors for linear modeling and, more specifically, to selecting useful channels for non-invasive medical devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the field of medicine, doctors often desire to monitor certain physiological characteristics of their patients. Accordingly, a wide variety of devices may have been developed for monitoring many such characteristics of a patient. Such devices may provide doctors and other healthcare personnel with the information they need to provide the best possible healthcare for their patients. As a result, such monitoring devices have become useful in treating patients.

Non-invasive medical devices may be particularly useful and desirable, as they generally provide immediate feedback and do not traumatize a patient. Generally, non-invasive sensors may transmit electromagnetic radiation, such as light, through a patient's tissue. The sensor may photoelectrically detect the absorption and scattering of the transmitted light in such tissue. The light passed through the tissue may be selected to be of one or more wavelengths that may be absorbed and scattered by particular tissue constituents, such as blood, for example. One or more physiological characteristics may then be calculated based upon the amount of light absorbed and/or scattered.

One non-invasive technique for monitoring certain physiological characteristics of a patient is commonly referred to as pulse oximetry, and the devices built based upon pulse oximetry techniques are commonly referred to as pulse oximeters. Pulse oximetry may be used to measure various blood flow characteristics, such as the blood-oxygen saturation of hemoglobin in arterial blood, the volume of individual blood pulsations supplying the tissue, and/or the rate of blood pulsations corresponding to each heartbeat of a patient. In fact, the "pulse" in pulse oximetry refers to the time varying amount of arterial blood in the tissue during each cardiac cycle. Pulse oximetry readings may measure the pulsatile, dynamic changes in amount and type of blood constituents in tissue.

However, in pulse oximetry, as well as other non-invasive monitoring techniques, the investigative instruments (e.g., NIR spectroscopes) commonly allow measurements in more discrete channels than the relevant underlying degrees of freedom or the number of objects under investigation. While a wide array of channels may provide greater predictive power, some channels may confound prediction of the relevant response, essentially measuring only "noise." Moreover, the principle of parsimony dictates that a predictive model must focus on as few of the channels as practical, or fewer.

SUMMARY

Certain aspects commensurate in scope with the originally claimed subject matter are set forth below. It should be understood that these aspects are presented merely to provide the reader with a brief summary of certain embodiments and that these aspects are not intended to limit the scope of the claims. Indeed, the claims may encompass a variety of aspects that may not be set forth below.

In accordance with an embodiment there is provided a method for selecting useful channels in a non-invasive medical device. The method includes embedding a discrete predictor problem into continuous space of a predictor preweighting and executing an optimization algorithm to optimize a preweighting vector, wherein the optimization algorithm determines the relative importance of the each predictor. Thereafter, n different models are constructed, wherein a $k^{th}$ model comprises the k most important predictors and the models are compared using an information criterion to allow for automatic selection of a subset of the predictors. An analytical Jacobian of the partial least squares regression vector is derived with respect to the predictor weighting to optimize the predictor weighting and select useful channels for use in the non-invasive medical device.

In accordance with an embodiment a system for identifying useless predictors is provided comprising a processor and a memory communicatively coupled to the processor. The memory stores a program embedded with a discrete predictor problem. Execution of the program comprises executing an optimization algorithm to optimize a preweighting vector, wherein the optimization algorithm determines the relative importance of the each predictor. Additionally, the execution of the program includes constructing n different models, wherein a $k^{th}$ model comprises the k most important predictors, and automatically selecting a subset of predictors by comparing the models using an information criterion. The system also derives an analytical Jacobian of the partial least squares regression vector with respect to the predictor weighting to optimize the predictor weighting and select useful channels for use in the non-invasive medical device.

BRIEF DESCRIPTION OF THE DRAWINGS

Certain embodiments may be understood reading the following detailed description and upon reference to the drawings in which.

DETAILED DESCRIPTION OF SPECIFIC EMBODIMENTS

Figure 1:
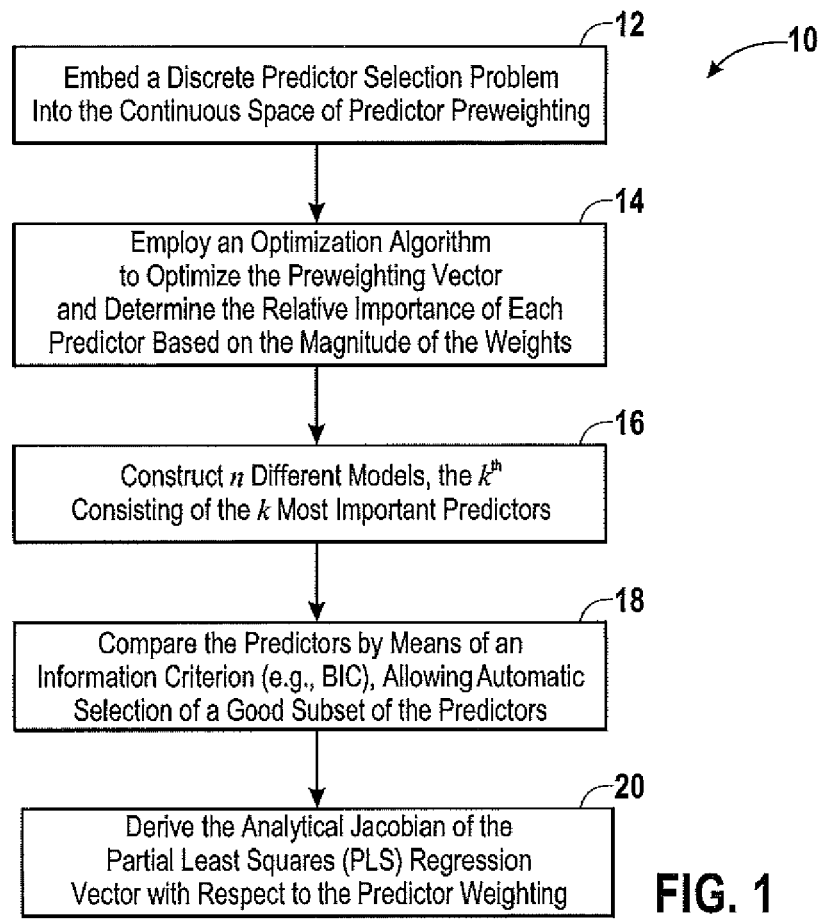
FIG. 1 is a flow chart illustrating the use of the SRCEK method to determine useful predictor and eliminate outliers.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

In order to eliminate the "noise" that may be incurred by operating useless predictors, such as wavelengths that produce outlier readings in a non-invasive medical device, a system and method are disclosed for selecting useful predictors for linear modeling of a response by a partial least squares (PLS). In particular, there is provided means for fitting observed data X (an m by n matrix) and y (an m vector), which may be representative of the data generated by a non-invasive medical device, may be fit to a linear model of the form: $y \approx \chi\beta + 1 b_0$. The fitting technique is capable of simultaneously selecting good subsets of the n available predictors in X and identifying outliers among the m objects of y. The linear model is then built by a weighted PLS regression on the "reduced" data (i.e., using non-outlier objects and the selected predictors).

Partial Least Squares (PLS) is a well known technique for estimation of linear models from data assumed to be of reduced rank. That is, it is assumed the number of relevant latent factors, l, is smaller (usually much smaller) than m and n. In the context of spectroscopy, usually m<<n, i.e., the number of objects observed is far fewer than the number of channels at which observations were made. It is also known that PLS should be combined with predictor selection, and not applied on full spectrum data, as the quality of fit degrades with a term proportional to $(n/m)^2$.

A number of techniques exist for the selection of subsets of predictors, including heuristic and statistical approaches. Some work has been done on simultaneous subset of outlier selection, based on wavelets. Additionally, a subset selection method using genetic algorithms has been patented. However, these may be limited to only finding outliers or predictors (not both), and/or time consuming, among other things. Moreover, a number of clever and theoretically well grounded techniques exist for the rejection of the useless wavelengths. For example, the issue of too many channels may be mitigated by the use of principal component regression (PCR) and partial least squares PLS), two algorithmic techniques which essentially project many variate predictors onto a small dimensional vector space before building a predictive model. While these techniques are good at capturing the largest or most relevant underlying variations in multivariate predictors, they are not impervious to disinformative or useless predictors, as it has been shown that the predictive ability of PLS is degraded by a term quadratic in the number of predictors. Alternatively, a heuristic wavelength selection algorithm may be used to reject useless wavelengths, although, it is a particularly slow method. Rather than discuss the variety of techniques in detail, readers are referred to "Selection of Useful Predictors in Multivariate Calibration," Forina et al., *Analytical and Bioanalytical Chemistry*, 380(3):387-418 (2004), which is incorporated herein by reference in its entirety, for further information.

Referring to the figures and initially turning to FIG. 1, a flow chart 10 illustrating the method for selecting useful predictors is shown. The method 10 embeds a discrete predictor selection problem into the continuous space of predictor preweighting, as indicated at block 12. The problem is essentially binary in nature and may be framed in several different manners. For example, the problem may consider whether the predictor is useful or not. Alternatively, the problem may consider if the predictor an outlier. Although outliers are typically not useful predictors they can still provide beneficial information, i.e, can tell which predictors are not useful.

Once the problem is embedded, an optimization algorithm, such as a Quasi-Nesvton optimization algorithm, for example, to optimize the preweighting vector is employed to determine the relative importance of each predictor, as indicated at block 14. The magnitudes of the weights indicate the relative importance of each predictor. The relative importances of the predictors are used to construct $7a$ different models, the $k^{th}$ consisting of the k most important predictors, as indicated at block 16. The different models are then compared by means of an information criterion (e.g., BIC), allowing automatic selection of a good subset of the predictors, as indicated at block 18. The analytical Jacobian of the partial least squares (PLS) regression vector with respect to the predictor weighting is derived to facilitate optimization of the predictor weighting, as indicated at block 20.

The method 10 exploits the reduced rank of the predictor matrix to gain some speedup when the number of observations is fewer than the number of predictors (the usual case for e.g., IR spectroscopy). The method 10 compares favourably with prior predictor selection techniques surveyed by Forina et al. and will be referred to herein as "SRCEK" which is an acronym for "Selecting Regressors by Continuous Embedding in k-dimensions."

The following discussion includes a description of a non-invasive medical device in which the method 10 may be implemented. The method 10 will then be described in great detail beginning with a detailed discussion of the problem followed by descriptions of alternative techniques that may be implemented in SRCEK, and experimental results.

Non-Invasive Medical Device

Figure 2:
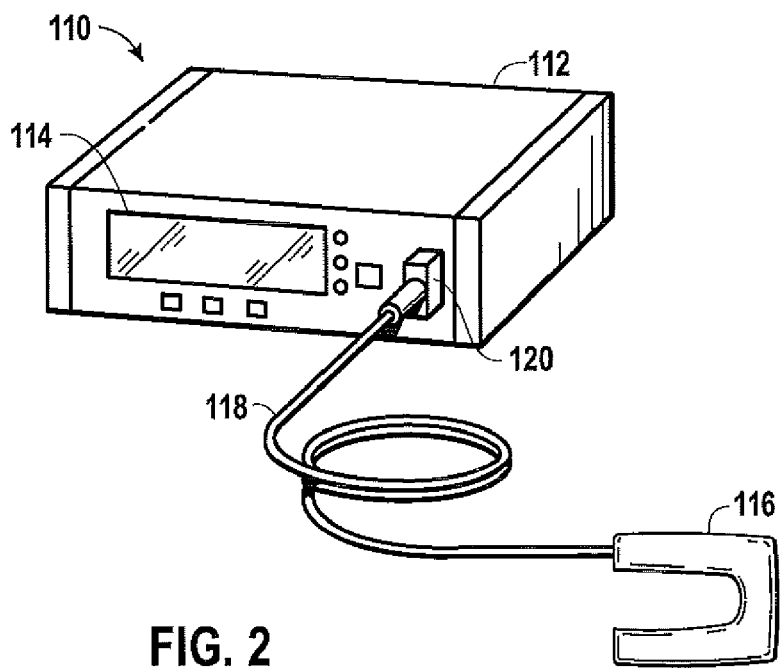
FIG. 2 illustrates a non-invasive medical device in accordance with an embodiment.

Referring to FIG. 2, a non-invasive medical device that may implement the SRCEK method is illustrated in accordance with an embodiment and is generally designated by the reference numeral 110. The system 110 includes a monitor 112 which may house hardware and sofgware configured to compute various physiological parameters. In accordance with an embodiment, the monitor 112 may be a pulse oximetry or multi-parameter monitor, such as those available from Nellcor Puritan Bennett L.L.C. and/or Covidien. The monitor 112 may include a display 114 to display the various physiological parameters, such as the percent oxygen saturation of hemoglobin and the pulse rate, for example. The display 114 may show the calculated values numerically and/or as a wave-form over time. Additionally, any notifications or alerts prompted by abnormal measurements, calculated values and/ or by poor contact between the sensor and the patient's tissue, as discussed below, may be displayed.

Figure 3:
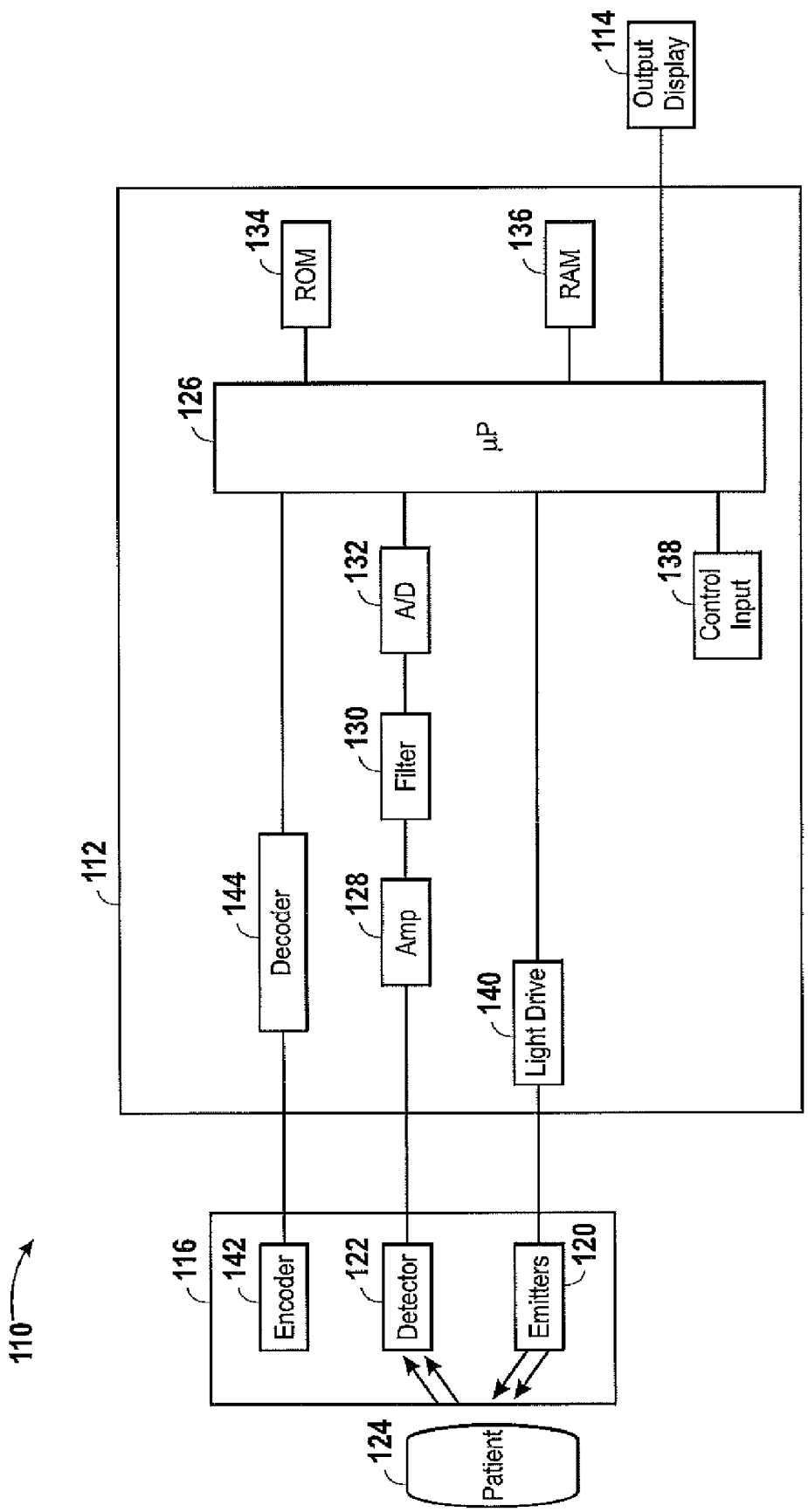
FIG. 3 illustrates a block diagram of the non-invasive medical device of FIG. 1.

A sensor 116 may be communicatively coupled to the monitor 112 via a cable 118 and a connector 120. A block diagram of the non-invasive medical device 110 is illustrated in FIG. 3. As can be seen, the sensor 116 includes emitters 120 which are capable of emitting electromagnetic radiation, or light. Specifically, the emitters 120 may be any suitable emitter such as LEDs, a broad spectrum emitter, or a scanning light source which may incrementally emit across a broad spectrum of wavelengths, for example. If a plurality of LEDs is used as emitters 120, each may emit at a discrete wavelength. Specifically, a first emitter may emit light in the red region of the electromagnetic spectrum, i.e., approximately 600 nm to 750 nm, while a second emitter 20 may emit light in the infrared (IR) region of the electromagnetic spectrum i.e., approximately 750 nm to 1 mm.

When device 110 is operating, a detector 122 detects electromagnetic radiation originating from the emitters 120 after it has passed through blood perfused tissue of a patient 124. For example, the detector may detect the electromagnetic radiation after it has passed through a tissue located on a patient's finger or a forehead. The detector 122 may include one or more photodetectors configured to detect light in the electromagnetic regions in which the emitters 120 operate. For example, in an embodiment, a silicon photodetector may be provided as well as an indium-gallium-arsenide photodetector, so that electromagnetic radiation in the red and infrared regions of the electromagnetic spectrum may be detected. The detector 122 generates a signal corresponding to the detected light. The signal generated by the detector 122 is provided to the monitor 112.

As illustrated, the monitor 112 includes a microprocessor 126 which receives the signal after it has been amplified (amplifier 128), filtered (filter 130) and converted to a digital signal (A/D converter 132). The microprocessor 126 may be configured to calculate various physiological parameters, characteristics, and/or other metrics of the patient 124 using algorithms programmed into the monitor 112. Additionally, the processor may be configured to operate the SRCEK algorithm in accordance with the following discussion.

The microprocessor 126 may be connected to other component parts of the monitor 112, such as a ROM 134, a RAM 136, and control inputs 138. The ROM 134 may be configured to store the algorithms used to compute the physiological parameters, characteristics, and/or metrics, and the RAM 136 may be configured to store the signals generated by the sensor 116 for use in the algorithms. The control inputs 138 may be provided to allow a user to interface with the monitor 112. The control inputs 138 may include soft keys, dedicated function keys, a keyboard, and/or keypad type interfaces for providing parameters, data, and/or instructions to the monitor 112. In certain embodiments, the control inputs 138 may also include speech or tone recognition or other audio, remote, and/or hands-free command input type devices.

A light drive unit 140 in the spectrophotometric monitor 112 may control the timing of the emitters 120. Additionally, to help avoid inaccurate readings, an encoder 142 and decoder 144 may be used to calibrate the monitor 112 to the actual wavelengths emitted by the emitters 120. The encoder 142 may be a resistor, for example, whose value corresponds to one or more of the emitter wavelengths so that proper coefficients stored in the monitor 112 may be selected. In another embodiment, the encoder 142 may be a memory device, such as an EPROM, that stores information, such as information related to the emitter wavelengths or the coefficients themselves, for example, Once the coefficients indicated by the encoder 142 are determined by the monitor 112, they may be inserted into the algorithms in order to calibrate the calculations that are being performed by the system 110.

In an alternative embodiment, the monitor may already be configured, i.e., programmed to operate on the basis that the emitters emit at certain wavelengths. These wavelengths are determined based on the techniques provided herein. Thus, for example, in the design of a medical device that uses spectroscopy to determine analyte concentrations in human tissue, a subset of available wavelengths are selected for use in the device and the device is programmed only for those selected wavelengths.

The Problem

Let X be an m×n matrix of observed predictors, with each row corresponding to an observed "object," and each column a "channel" of the investigative instrument. Let y be an m-dimensional column vector of responses of each of the objects. In the general context of chemometrics, the number of objects is generally far fewer than the number of channels: m<<n. A linear predictive model is an n-vector $\beta$ such that y≈χβ. When calibrated on a given collection of predictors and responses X and y, different algorithms produce different linear models.

A good model is marked by a residual with small norm. That is, $\Sigma_i \epsilon_i^2$ is small, where $\epsilon = y - \chi\beta$ is the residual. However, a model which explains the observed data well may give poor predictive ability over as-yet-observed objects, due to "overfitting."

Cross validation (CV) is used to address this deficiency. The idea is to divide the tested objects into two groups, one of which is used to build a model $\beta$, the other is used to test the quality of the model. By leaving these validation or test objects out of the calibration, this technique simulates the predictive ability of the observed data on unobserved data.

Because the division in two groups is arbitrary, the process is often repeated in a round robin fashion, with different subdivisions. The quality of prediction of each division is then averaged. In the most extreme form, known as "leave one out" (LOO) or "delete-1", the model building and testing is performed m times, each time with m−1 objects in the calibration group, and the single remaining object in the test group. For comparing different subsets of the predictors, Shao proved that delete-1 CV is asymptotically inconsistent, i.e., it has a nonzero probability of overfitting.

To facilitate understanding, some terminology is presented. The norm (more specifically the 2-norm) of a vector v is its Euclidian length: $\|v\|_2 = \sqrt{\Sigma_i v_i^2} = \sqrt{v^T v}$. The mean square norm of a k-dimensional vector, $\|v\|_2^2/k$. The mean squared error of a model $\beta$ for a given data $\chi$ and y is the mean square norm of the residual y−χβ. The mean squared error of cross validation (MSECV) is the mean over each cross validation group of the mean square error of the model built by the calibration group on the test group:

$$MSECV = \frac{1}{J}\sum_{j=1}^{J}\frac{1}{m_j}\|y_j - \chi_j\beta_j\|_2^2,$$

where $\chi_j$ and $y_j$ are predictors and response of the $j^{th}$ calibration group. The mean squared error of prediction (NSEP) of a model is the mean square error of the data used to build the model: MSEP=$\|y-\chi\beta\|_2^2$/m, where $\beta$ is built using the data $\chi$ and y.

The prefix "roof" refers to square root, thus, the root mean squared error of cross validation (RMSECV) is $\sqrt{MSECV}$; similarly for RMSEP, etc. The RMSECV has the same units as the response. Thus, while a smaller RMSECV usually signifies a better model building technique, interpretation of RMSECV is difficult without comparison to the distribution of the responses. Thus, a modeling technique is often compared to a trivial modeler, one which approximates the response by the mean of the calibration responses and ignores the predictors altogether. The MSECV of this technique is a weighted average estimate of the variance of the observed responses:

$$MSETCV = \frac{1}{j}\sum_{j=1}^{j} \frac{1}{m_j} \|y_j - \bar{y}_j\|_2^2,$$

where $\bar{y}_j$ is the mean of the calibration responses in the $j^{th}$ cross validation group. The "T" stands for "trivial." This terminology is nonstandard. Comparing the MSECV to the MSETCV gives the cross-validation percent explained variance of the model building technique, $Q^2=100\%$ (MSETCV−MSETCV)/MSETCV.

The goal of channel selection appears to be, given the observed data, the CV groups and a model building technique, select the subset of the n available columns of $\chi$ which minimizes RMSECV (or equivalently, maximizes $Q^2$) when only those columns of $\chi$ are used in the model building and testing. In this formulation the number of possible solutions is $2^n$ and an exhaustive search becomes impractical when n is larger than about 17. Subset selection heuristics such as Tabu search, Simulated Annealing (SA) and Genetic Algorithms (GA), which generate and test subsets of the n available columns, can only hope to explore a small part of the $2^n$ sized discrete space of possible subsets, and are susceptible to falling into local minima.

Considerable progress was made on the problem by the introduction of iterative predictor weighting (IPW). This channel selection technique reformulates the problem as one of selecting a vector in n dimensional Euclidian space, hereafter denoted $\mathbb{R}^n$, rather than on the discrete space of binary n-dimensional vectors. In teems of size if the search space there would seem to be no advantage to this reformulation. However, the continuous embedding allows the importance of each channel to be evaluated and changed simultaneously, in parallel, rather than serially.

Predictive weighting can be viewed as a preprocessing step. Let $\lambda \in \mathbb{R}^n$ be a vector of weights. Let $\Lambda$ be the diagonal n×n matrix whose diagonal is the vector $\lambda$. Hereafter, diag(v) denotes the diagonal matrix whose diagonal is v, so $\Lambda$=diag($\lambda$). The $\lambda$-weighted predictor matrix is the product $X \Lambda$: the $k^{th}$ column of the weighted predictor matrix is the $k^{th}$ column of X times $\lambda_k$. Weighted predictors are then used in the cross validation study, both in the calibration and test sets. As such the quality of the cross validation (RMSECV or $Q^2$) can be viewed as a scalar function of the vector $\lambda$, once the data and CV groups and model building method (and order) have been fixed.

Note that when the regression model β is built by ordinary least squares (OLS), the quality of cross validation is constant with respect to $\lambda$. This occurs because the weighted regression model output by OLS is constant with respect to nonzero predictor weighting, i.e., $\Lambda\beta(\lambda)$, is constant over all $\lambda$ with nonzero elements, PLS, however, does not share this property, and the quality of cross validation is affected by predictor weighting. When used as a preprocessing technique prior to the application of PLS, the usual strategy is to apply predictor weighting A where $\lambda_k=1/\hat{\sigma}_k^2$, where $\hat{\sigma}_k^2$ is the sample standard deviation of the $k^{th}$ channel based on the observations in the entire sample X, a technique called "autoscaling." There is no reason to believe a priori that this choice of $\lambda$ gives good cross validation. Rather an a priori choice of weighting should depend on knowledge of the test instrument of the tested objects. Alternatively, one can let the data inform the choice of predictor weighting.

The SRCEK method disclosed herein minimizes the RMSECV as a function of $\lambda$. This can be achieved by any of a number of modern optimization algorithms, including BFGS, as will be discussed in detail below. Once a local minimum has been found, the magnitude of the elements of the optimal $\lambda$ suggests the importance of the corresponding channels to the observed data. This ordering suggests n different models, the $k^{th}$ consisting of the first k channels by order of decreasing importance. These models can then be compared using any model selection technique, e.g., minimization of RMSECV or an information criterion.

The SRCEK method can accept, as an objective function, the root mean square error of cross validation (RMSECV) for a given set of cross validation (CV) groupings. Alternatively, there is an embedding of Schwvarz' Bayesian Information Criterion (BIC), which mixes model quality with model parsimony, avoiding overfitting (i.e., models with too may predictors or outliers). One can, optionally select to not allow any outliers or to use all predictors and only find outliers.

The SRCEK method has a number of advantages over other techniques for predictor selection. Specifically, it can simultaneously find outliers and predictors, it is deterministic and has a sound theoretical basis, it can be easily adapted to the latest trends in model comparison (e.g., using GIC instead of BIC), it takes advantage of extant optimization software, it is fast (although the computational speed tradeoff should be balanced by using more CV groups), and it does not assume that adjacent predictors have high covariance (like some wavelet techniques). Moreover, early experiments indicate it is equal or superior to those techniques surveyed by Forina et al. Additionally, the SRCEK method provides many tweakable parameters, for which reasonable defaults values are not yet generally known, that allow for broad applicability.

As mentioned earlier, SRCEK is an optimization approach that embeds the essentially binary problem of selecting/rejecting predictors and objects into a continuous space where they are each given a weighting. Any modern optimization technique (for example, the quasi-Newton algorithm known as BEGS), can then optimize an objective function (usually a measure of the quality of the fit) with respect to the weights. The embedding can then be reversed by using the weights to order the predictors and objects, then checking the successive models suggested by the weights. In order to interface with the optimization code, an algorithm has been devised which quickly computes the Jacobian of the residual with respect to the weightings. This formulation exploits the reduced rank (m≦n) to get a runtime speedup.

PLS Regression

The assumption underlying PLS regression is that predictor and response take the form $$X = \tilde{T}^{(0)}\tilde{P}^{(0)T} + \tilde{T}^{(1)}\tilde{P}^{(1)T} + \ldots + \tilde{T}^{(l)}P^{(l)T} + E, \quad (1)$$

$$y = \tilde{T}^{(0)}\tilde{q}0 + \tilde{T}^{(1)}\tilde{q}1 + \ldots \tilde{T}^{(l)}\tilde{q}l + f, \quad (2)$$

where the vectors $\tilde{T}^{(k)}$ are orthogonal, and the remainder terms, E and f, are random variables. The vector $T^{(0)}$ is 1, the vector of all ones. It is also assumed that the response remainder term, f, is homoscedastic, i.e., $$E[ff^T] = \sigma_y^2 I.$$

When this assumption cannot be supported, weighted PLS (WPLS) regression is appropriate. [19, 14, 17] Let $\Gamma$ be a symmetric positive definite matrix such that $\Gamma = cE[ff^T]^{-1}$, for some (perhaps unknown) scalar c. Weighted PLS assumes a decomposition of X and y as in equations 1 and 2, but with the property that the vectors $\tilde{T}^{(k)}$ are $\Gamma$-orthogonal: $\tilde{T}^{(k)T}\Gamma\tilde{T}^{(j)}=0$ if $k \neq j$.

WPLS regression with l factors computes m×l matrix T, n×l matrix P and l vector q such that $$X \approx T^{(0)}P^{(0)T}, \text{ and } y \approx T^{(0)}q0 + Tq,$$

where $T^{(0)}$ is the vector of all ones, and $P^{(0)}$ and q0 are the ($\Gamma$-weighted) means X and y. The linear (actually affine) model constructed by WPLS takes the form $\beta = W(P^T W)^{-1}q$, for some matrix W, with offset $b_0 = q_0 - P^{0T}\beta$. Thus $X^k \beta + T^{(0)} b_0 \approx T^{(0)}P^{(0)T}\beta + TP^T W(P^T W)^{-1}q + T^{(0)}q_0 - T^{(0)}P^{(0)T}\beta = T^{(0)}q_0 - Tq \approx y$.

The use of the words "weight" or "weighting" in this context is traditional, and parallels the usage for ordinary least squares. It should not be confused with the predictor weighting of the channels. To distinguish them, $\Gamma$ will refer to the object weights and is assumed to be a diagonal vector, $\Gamma = \text{diag}(\gamma)$. This is not necessary for correctness of the algorithm, only for the fast runtime of the algorithm, for which a sufficiently sparse $\Gamma$ would also suffice.

RMSECV and its Gradient

Given fixed data) the existence of a selected order l is presupposed The selection of l should be informed by the underlying structure of the objects under investigation, or by an automatic technique. In the chemometric context, the number of factors should be less preferably far less) than the number of objects: $l \leq m$. Let $\phi(\lambda)$ be the RMSECV for the CV when the CV groups are fixed, and the linear model is built by l-factor WPLS with $\gamma$ given, and using predictor weights $\lambda$. To employ quasi-Newton minimization, the gradient of $\phi$ with respect to $\lambda$ must be computed. While this can be approximated numerically with little extra programmer effort, the computational overhead can be prohibitive. Thus the analytic formulation of the gradient is developed.

In general formulation, there is an object weight associated with each observation. These weights should be used in both the model construction and error computation phases. Thus, the RMSECV is rewritten as a weighted RMSECV as follows:

$$\phi(\lambda) = \sqrt{\frac{1}{J}\sum_{j=1}^{J}\frac{\varepsilon^{(j)T}\Gamma^{(j)}\varepsilon^{(j)}}{1^{(j)T}\Gamma^{(j)}1^{(j)}}},$$

where $\varepsilon^{(j)}$ is the residual of the $j^{th}$ test group, $\Gamma^{(j)}$ is the diagonal matrix of the object weights of the $j^{th}$ test group, and $1^{(j)}$ is the appropriate length vector of all ones. The gradient of this is:

$$\nabla_\lambda \phi(\lambda) = \frac{1}{\phi(\lambda)}\frac{1}{J}\sum_{j=1}^{J}\frac{1}{1^{(j)T}\Gamma^{(j)}1^{(j)}}\frac{\partial\varepsilon^{(j)T}}{\partial\lambda}\Gamma^{(j)}\varepsilon^{(j)},$$

Each residual takes the form: $\varepsilon = _{tst} - (X_{tst} \wedge \beta(\lambda) + 1_{tst} b_0(\lambda))$.

Thus, the Jacobian of the residual is:

$$\frac{\partial \varepsilon}{\partial \lambda} = -X_{tst}\left(\text{diag}(\beta(\lambda)) + \wedge \frac{\partial \beta(\lambda)}{\partial \lambda}\right) - 1_{tst}\nabla\lambda_0^{bT}. \quad (3)$$

(Consult equation 7 and equation 8 in Section A for proofs.) Here and in the following, $X_{cat}, Y_{cat}$ are used to refer to the calibration objects, and $X_{tst}$ and $Y_{tst}$ to refer to the test objects of a single cross validation partitioning. This reduces the problem to the computation of the Jacobian and gradient of the WPLS regression vector and offset with respect to $\lambda$.

WPLS Computation

A variant of the canonical WPLS computation is given in Algorithm 1. This algorithm is different from the usual formulation in that the vectors and $W^{(k)}$, $T^{(k)}$ and $P^{(k)}$ are not normalized; it is simple to show, however, that the resultant vectors $W^{(k)}$, $T^{(k)}$ and $P^{(k)}$ are identical to those produced by the canonical computation, up to scaling. The change in scaling does not affect the resultant regression vector, $\beta$, nor does it change the matrix $X^{(k)}$.

---

Algorithm 1 Algorithm to compute the WPLS regression vector.

Input: m × n matrix and m vector, number of factors, and a diagonal object weight matrix.
Output: The regression vector and offset.
WPLS $(X^{(o)}, y, l, \Gamma = \text{diag}(\lambda))$
(1)  $T^{(U)} \leftarrow 1$.
(2)  for k = 0 to l
(3)    $t_k \leftarrow T^{(k)T}\Gamma T^{(k)}$.                (Requires $\Theta(m)$ flops per loop.)
(4)    $P^{(k)} \leftarrow X^{(k)T}\Gamma T^{(k)}/t_k$.       (Requires $\Theta(mn)$ flops per loop.)
(5)    $q_k \leftarrow y^T \Gamma T^{(k)}/t_k$.              (Requires $\Theta(m)$ flops per loop.)
(6)    if $y^T \Gamma T^{(k)} = 0$
(7)      Maximum rank achieved; Let l = k and break the for loop.
(8)    if k < l
(9)      $X^{(k+1)} \leftarrow X^{(k)} - T^{(k)}P^{(k)T}$.   (Requires $\Theta(mn)$ flops per loop.)
(10)     $W^{(k+1)} \leftarrow X^{(k+1)T}\Gamma$.           (Requires $\Theta(mn)$ flops per loop.)
(11)     $T^{(k+1)} \leftarrow X^{(k+1)}W^{(k+1)}$.          (Requires $\Theta(mn)$ flops per loop.)
(12)  Let W be the matrix with columns $W^{(1,2,...,l)}$. Similarly define P, q.
(13)  $\beta \leftarrow W(P^T W)^{-1} q$. (Requires $\Theta(nl)$ flops, using back substitution.)
(14)  $b_0 \leftarrow q_0 - P^{(0)T}\beta$.
(15)  return $(\beta, b_0)$

---

As in canonical WPLS, the matrix PTW is bidiagonal upper triangular; however, for this variant, the matrix has unit main diagonal. This variant of the algorithm may be more amenable to a Jacobian computation, although conceivably it could be susceptible to numerical underflow or overflow.

A Rank Sensitive Implicit WPLS Algorithm

A different way of computing the same results as Algorithm 1 is now presented, but by reusing old computations to compute seemingly unnecessary intermediate quantities which will be useful in the Jacobian computation. Moreover, the Jacobian computation will exploit the assumption that $m<<n$ to gain an asympototic reduction in runtime. This is achieved by performing the computations in the m-dimensional space, that is in the quantities related to y and $T^{(k)}$, and avoiding the n-dimensional quantities $W^{(k)}$ and $P^{(k)}$.

The variant algorithm introduces the "preimage" vectors $V^{(k)}$ and the preimage of the regression coefficient $\alpha$. "Preimage" means in $X^{(0)T}\Gamma$, thus, as an invariant, these vectors will satisfy $W^{(k)} = X^{(0)T}\Gamma V^{(k)}$ and $\beta = X^{(0)T}\Gamma\alpha$. The variant algorithm also computes the vectors $Q^{(k)} = X^{(0)}X^{(0)T}\Gamma V^{(k)}$, and $U^{(k)} = Q^{(k)} - T^{(0)}T^{(0)T}\Gamma Q^{(k)}/t_0$, and the scalars $r_k = y^T \Gamma T^{(k)}$ and $w_k = T^{(k)T}\Gamma U^{(k+1)}/t_k$.

Note that any explicit updating of the matrix $X^{(k)}$ is absent from this version of the algorithm, rather than updating is performed implicitly. This will facilitate the computation of the Jacobian when $X^{(0)}$ is replaced in the sequel by $X^{(0)^{\wedge}}$. The following Lemma 6 confirms that this variant form of the algorithm produces the same results as Algorithm 1, that is the same vectors T and q, consistent vectors V, and produces the same linear model $\beta$.

Lemma 6.1. Let $X^{(k)}$, $\Gamma$, $W^{(k)}$, $T^{(k)}$, $P^{(k)}$, and $q_k$ be us in Algorithm 1. Let $V^{(k)}$ be the preimage of $W^{(k)}$, i.e., $V^{(k)}$ is a vector such that $W^{(k)} = X^{(0)^T} \Gamma V^{(k)}$. Let $Q^{(k)} = X^{(0)} X^{(0)^T} \Gamma V^{(k)}$, and $U^{(k)} = Q^{(k)} - T^{(0)} T^{(0)^T} \Gamma Q^{(k)}/t_0$ for $k \geq 1$. Let $r_k = y^T \Gamma T^{(k)}$, and $w_k = T^{(k)^T} \Gamma U^{(k+1)}/t_k$ for $k \geq 0$. Then the following hold:

1. $P^{(k)} = X^{(0)^T} \Gamma T^{(k)}/t_k$, for $k \geq 0$.

2. $w_k = P^{(k)^T} W^{(k+1)}$ for $k \geq 1$, and $w_0 = 0$.

3. $T^{(k+1)} = U^{(k+1)} - w_k T^{(k)}$ for $k \geq 0$.

4. $V^{(k+1)} = V^{(k)} - q_k T^{(k)}$ for $k \geq 0$, where $V^{(0)} = y$ by convention.

Proof: The Parts of the Lemma:

1. Rewrite $X^{(k)}$, then use the fact that the T are $\Gamma$-orthogonal Lemma 5.1 item 5):

$$P^{(k)} = X^{(k)^T} \Gamma T^{(k)}/t_k$$
$$= (X^{(0)} - T^{(0)} P^{(0)^T} - \ldots - T^{(k-1)} P^{(k-1)^T})^T \Gamma T^{(k)}/t_k$$
$$= (X^{(0)^T} - P^{(0)} T^{(0)^T} - \ldots - P^{(k-1)} T^{(k-1)^T}) \Gamma T^{(k)}/t_k$$
$$= X^{(0)^T} \Gamma T^{(k)}/t_k.$$

2. By definition, and $\Gamma$-orthogonality of the T:

$$w_k = T^{(k)^T} \Gamma U^{(k+1)}/t_k$$
$$= T^{(k)^T} \Gamma (Q^{(k+1)} - T^{(0)} c)/t_k$$
$$= T^{(k)^T} \Gamma Q^{(k+1)}/t_k,$$
$$= T^{(k)^T} \Gamma X^{(0)} X^{(0)^T} \Gamma V^{(k+1)}/t_k$$
$$= (T^{(k)^T} \Gamma X^{(0)}/t_k)(X^{(0)^T} \Gamma V^{(k+1)})$$
$$= P^{(k)^T} W^{(k+1)}, \text{ using item 1.}$$

To show $w_0 = 0$ it suffices to note that $U^{(k)}$ is chosen to be $\Gamma$-orthogonal to $T^{(0)}$: $T^{(0)^T} \Gamma U^{(k)} = T^{(0)^T} \Gamma (Q^{(k)} - T^{(0)} T^{(0)^T} \Gamma Q^{(k)}/t_0) = T^{(0)^T} \Gamma Q^{(k)} - (t_0/t_0) T^{(0)^T} \Gamma Q^{(k)}$ 3. For $k > 0$, rewrite $X^{(k+1)}$:

$$T^{(k+1)} = X^{(k+1)} W^{(k+1)}$$
$$= (X^{(0)} - T^{(0)} P^{(0)^T} - \ldots - T^{(k-1)} P^{(k-1)^T} - T^{(k)} P^{(k)^T}) W^{(k+1)},$$
$$= X^{(0)} W^{(k+1)} - T^{(0)} P^{(0)^T} W^{(k+1)} - T^{(k)} P^{(k)^T} W^{(k+1)},$$
(Lemma 5.1 item 7),
$$= Q^{(k+1)} - T^{(0)} T^{(0)^T} X^{(0)} W^{(k+1)}/t_0 - T^{(k)} w_k, \text{ (using item 2),}$$
$$= U^{(k+1)} - T^{(k)} w_k.$$

For $k = 0$, since $w_0 = 0$, it suffices to show $T^{(1)} = U^{(1)}$. Rewriting $X^{(1)}$:

$$T^{(1)} = X^{(1)} W^{(1)}$$
$$= X^{(0)} W^{(1)} - T^{(0)} P^{(0)^T} W^{(1)}$$
$$= Q^{(1)} - T^{(0)} T^{(0)^T} X^{(0)} W^{(1)}/t_0$$
$$= U^{(1)}.$$

4. First, for $k > 0$, restate item 6 of Lemma 5.1: $W^{(k+1)} = W^{(k)} - P^{(k)} T^{(k)^T} \Gamma y$. Factoring to preimages using item 1 gives $V^{(k+1)} = V^{(k)} - T^{(k)} T^{(k)^T} \Gamma y/t_k$. The definition of $q_k$ then gives the result. For $k = 0$, rewrite $X^{(1)}$: $W^{(1)} = (X^{(0)} - T^{(0)} P^{(0)^T})^T \Gamma y - X^{(0)^T} \Gamma T^{(0)} T^{(0)^T} \Gamma y/t_0$, thus $V^{(1)} = y - T^{(0)} q_0$.

For concreteness, the WPLS algorithm is presented via intermediate calculations as Algorithm 2.

---

Algorithm 2 Algorithm to compute the WPLS regression vector, with X(k) implicit.

Input: Matrix and vector, factors, and diagonal object weight matrix.
Output: The regression vector and offset.
$_{IMPLICIT}$WPLS($X^{(0)}$, y, l, $\Gamma$ = diag($\gamma$))
(1)    M ← $I_l$, the l × l identity matrix.
(2)    Precompute $X^{(0)} X^{(0)^T} \Gamma$.
(3)    $T^{(0)}$ ← 1, $V^{(0)}$ ← y.
(4)    for k = 0 to l
(5)        $r_k$ ← $y^T \Gamma T^{(k)}$.
(6)        if $r_k$ = 0
(7)            Full rank achieved; Let l = k and break the for loop.
(8)        $t_k$ ← $T^{(k)^T} \Gamma T^{(k)}$.
(9)        $q_k$ ← $r_k/t_k$.
(10)       if k < l
(11)           $V^{(k+1)}$ ← $V^{(k)} - q_k T^{(k)}$.
(12)           Let $Q^{(k+1)}$ ← $(X^{(0)} X^{(0)^T} \Gamma) V^{(k+1)}$.
(13)           Let $U^{(k+1)}$ ← $Q^{(k+1)} - T^{(0)} T^{(0)^T} \Gamma Q^{(k+1)}/t_0$.
(14)           $w_k$ ← $T^{(k)^T} \Gamma U^{(k+1)}/t_k$.
(15)           $T^{(k+1)}$ ← $U^{(k+1)} - w_k T^{(k)}$.
(16)       if k > 0
(17)           $M_{k,k+1}$ ← $w_k$.
(18)   Let V be the matrix with columns $V^{(1,2,\ldots,l)}$. Similarly define q.
(19)   $\alpha$ ← $VM^{-1} q$, $\beta$ ← $X^{(0)^T} \Gamma \alpha$, $b_0$ ← $q_0 \to T^{(0)^T} \Gamma X^{(0)} \beta/t_0$.
(20)   return ($\beta$, $b_0$).

---

WPLS Computation with Jacobian

Algorithm 2 is amended with derivative computations to create an algorithm that computes the regression coefficient for input $X^{(1)^\wedge}$, and $y^{(1)}$, and returns the preimage of the regression vector, $\alpha$, as well as its Jacobian $\partial\alpha/\partial\lambda$, and the gradient of the offset, $\nabla\lambda b_0$. This is given as Algorithm 3 on the following page. In addition to the intermediate quantities used in Algorithm 2, this algorithm also computes some intermediate derivatives, some which need to be stored until the end of the computation. The required derivatives are:

$$\frac{\partial V^{(k)}}{\partial \lambda}, \nabla_\lambda q_k \text{ and } \nabla_\lambda w_k \text{ for } k \geq 1, \text{ and } \nabla_\lambda r_k, \frac{\partial U^{(k)}}{\partial \lambda},$$

$$\nabla_\lambda t_k, \text{ and } \frac{\partial T^{(k)}}{\partial \lambda},$$

for the most recent k.

Careful inspection and the vector calculus rules outlined above in Section A are all that is required to verify that Algorithm 3 correctly computes the Jacobian of the model B. The only theoretical complication in the transformation of Algorithm 2 to Algorithm 3 is the explicit formulation of the back substitution to compute $v = M^{-1} q$. Given that M is upper triangular, bidiagonal with unit diagonal, inspection reveals that the back substitution in Algorithm 3 is computed correctly.

Algorithm 3

*Algorithm to compute the WPLS regression vector and Jacobian.*

Input: Predictor and response, factors, object weights and channel weights.
Output: The preimage of the regression vector and its Jacobian, and the offset and its gradient.

WPLSANDJACOBIAN $X^{(1)}$, y, l, $\gamma$, $\lambda$)

(1) Precompute $X^{(0)} \bigwedge^2 X^{(0)T} \Gamma$.

(2) $T^{(0)} \leftarrow 1, \frac{\partial T^{(0)}}{\partial \lambda} \leftarrow 0, V^{(0)} \leftarrow y, \frac{\partial V^{(0)}}{\partial \lambda} \leftarrow 0$.

(3) for k = 0 to l (4) $r_k \leftarrow y^T \Gamma T^{(k)}, \nabla_\lambda r_k \leftarrow \frac{\partial T^{(k)}}{\partial \lambda}^T \Gamma y$.

(5) if $r_k = 0$ (6) Full rank achieved; Let l = k and break the for loop.

(7) $t_k \leftarrow T^{(k)T} \Gamma T^{(k)}, \nabla_\lambda t_k \leftarrow 2 \frac{\partial T^{(k)}}{\partial \lambda}^T \Gamma T^{(k)}$.

(8) $q_k \leftarrow r_k/t_k, \nabla_\lambda q_k \leftarrow (t_k \nabla_\lambda r_k - r_k \nabla_\lambda t_k)/t_k^2$.

(9) if k < l

(10) $V^{(k+1)} \leftarrow V^{(k)} - q_k T^{(k)}$ $\frac{\partial V^{(k+1)}}{\partial \lambda} \leftarrow \frac{\partial V^{(k)}}{\partial \lambda} - q_k \frac{\partial T^{(k)}}{\partial \lambda} - T^{(k)} \nabla_\lambda q_k^T$.

(11) Let $Q^{(k+1)} \leftarrow (X^{(0)} \bigwedge^2 X^{(0)T} \Gamma) V^{(k+1)}$, $\frac{\partial Q^{(k+1)}}{\partial \lambda} \leftarrow X^{(0)} \bigwedge^2 X^{(0)T} \Gamma \frac{\partial V^{(k+1)}}{\partial \lambda} + 2X^{(0)} \bigwedge \operatorname{diag}(X^{(0)T} \Gamma V^{(k+1)})$.

(12) Let $U^{(k+1)} \leftarrow Q^{(k+1)} - T^{(0)} T^{(0)T} \Gamma Q^{(k+1)}/t_0$, $\frac{\partial U^{(k+1)}}{\partial \lambda} \leftarrow \frac{\partial Q^{(k+1)}}{\partial \lambda} - T^{(0)} T^{(0)T} \Gamma \frac{\partial Q^{(k+1)}}{\partial \lambda}/t_0$,

(13) $w_k \leftarrow T^{(k)T} \Gamma U^{(k+1)}/t_k$, $\nabla_\lambda w_k \leftarrow \left( \frac{\partial T^{(k)}}{\partial \lambda}^T \Gamma U^{(k+1)} + \frac{\partial U^{(k+1)}}{\partial \lambda}^T \Gamma T^{(k)} - w_k \nabla_\lambda t_k \right)/t_k$.

(14) $T^{(k+1)} \leftarrow U^{(k+1)} - w_k T^{(k)}$ $\frac{\partial T^{(k+1)}}{\partial \lambda} \leftarrow \frac{\partial U^{(k+1)}}{\partial \lambda} - w_k \frac{\partial T^{(k)}}{\partial \lambda} - T^{(k)} \nabla_\lambda w_k^T$,

(15) Let $v_l \leftarrow q_l, \nabla_\lambda v_l \leftarrow \nabla_\lambda q_l$.

(16) for j = l − 1 to 1

(17) $v_j \leftarrow q_j - w_j v_{j+1}$, $\nabla_\lambda v_j \leftarrow \nabla_\lambda q_j - w_j \nabla_\lambda v_{j+1} - v_{j+1} \nabla_\lambda w_j$.

(18) $\alpha \leftarrow Vv, \frac{\partial \alpha}{\partial \lambda} \leftarrow V \frac{\partial v}{\partial \lambda}$.

(19) for j = 1 to l

(20) $\frac{\partial \alpha}{\partial \lambda} \leftarrow \frac{\partial \alpha}{\partial \lambda} + v_j \frac{\partial V^{(j)}}{\partial \lambda}$.

(21) $b_0 \leftarrow T^{(0)T} \Gamma(y - X^{(0)} \bigwedge^2 X^{(0)T} \Gamma \alpha)/t_0$, $\frac{\partial b_0}{\partial \lambda} \leftarrow -\left( X^{(0)} \bigwedge^2 X^{(0)T} \Gamma \frac{\partial \alpha}{\partial \lambda} + 2X^{(0)} \bigwedge \operatorname{diag}(X^{(0)T} \Gamma \alpha) \right)^T \Gamma T^{(0)}/t_0$.

(22) return $\left( \alpha, \frac{\partial \alpha}{\partial \lambda}, b_0, \nabla_\lambda b_0 \right)$.

Inspection of Algorithm 1 reveals that WPLS computation requires $\Theta$ (mnl) floating point operations where $X^{(1)}$ is m×n, and l is the ultimate number of factors used. Thus, a numerical approximation to the Jacobian using n evaluations of Algorithm 1 gives an algorithm with asymptotic runtime of $\Theta$ ($mn^2 l$). Inspection of Algorithm 3 reveals that it computes the Jacobian exactly in $\Theta$ ($m^2 nl$). The runtime limiting operation is the multiplication $$(X^{(0)} \bigwedge^2 X^{(0)T} \Gamma) \frac{\partial V^{(k+1)}}{\partial \lambda}$$

in the calculation of $$\frac{\partial U^{(k+1)}}{\partial \lambda},$$

with runtime of a $\Theta$ ($m^2 n$) per loop.

It would appear that one would incur a further cost of $\Theta$ ($mn^2$) in the conversion of $$\frac{\partial \alpha}{\partial \lambda} \text{ to } \frac{\partial \beta}{\partial \lambda},$$

as it requires the multiplication $$\bigwedge X^{(1)T} \Gamma \frac{\partial \alpha}{\partial \lambda}.$$

However, this can be avoided if the ultimate goal is computation of the Jacobian of the residual, rather than the Jacobian of the regression coefficients. Referring back to equation 3, we have $$\frac{\partial \varepsilon}{\partial \lambda} + 1_{tst} \nabla_\lambda b_0^\top = -X_{tst}\left(\operatorname{diag}(\beta(\lambda)) + \bigwedge \frac{\partial \beta(\lambda)}{\partial \lambda}\right), =$$

$$-X_{tst}\left(\operatorname{diag}(\bigwedge X_{cal}^\top \Gamma \alpha(\lambda)) + \frac{\partial \bigwedge X_{cal}^\top \Gamma \alpha(\lambda)}{\partial \lambda}\right), =$$

$$-X_{tst}\left(\operatorname{diag}\left(\bigwedge X_{cal}^\top \Gamma \alpha(\lambda)\right) + \bigwedge \operatorname{diag}(X_{cal}^\top \Gamma \alpha(\lambda)) + \bigwedge^2 X_{cal}^\top \Gamma \frac{\partial \alpha(\lambda)}{\partial \lambda}\right), =$$

$$-2 X_{tst} \operatorname{diag}(\bigwedge X_{cal}^\top \Gamma \alpha(\lambda)) - (X_{tst} \bigwedge^2 X_{cal}^\top) \Gamma \frac{\partial \alpha(\lambda)}{\partial \lambda}.$$

Letting $m_t$ be the number of objects in the calibration object, the multiplication $X_{tst} \Lambda^2 X_{cal}^T$ requires O ($mm_t n$) flops, and the multiplication $$(X_{tst} \bigwedge^2 X_{cal}^\top) \Gamma \frac{\partial \alpha(\lambda)}{\partial \lambda}$$

also requires O ($mm_t n$) flops, Thus, the computation of $$\frac{\partial \epsilon}{\partial \lambda}$$

can be done with O ($mm_t n + m^2 nl$) flops, which is linear in n.

Figure 4:
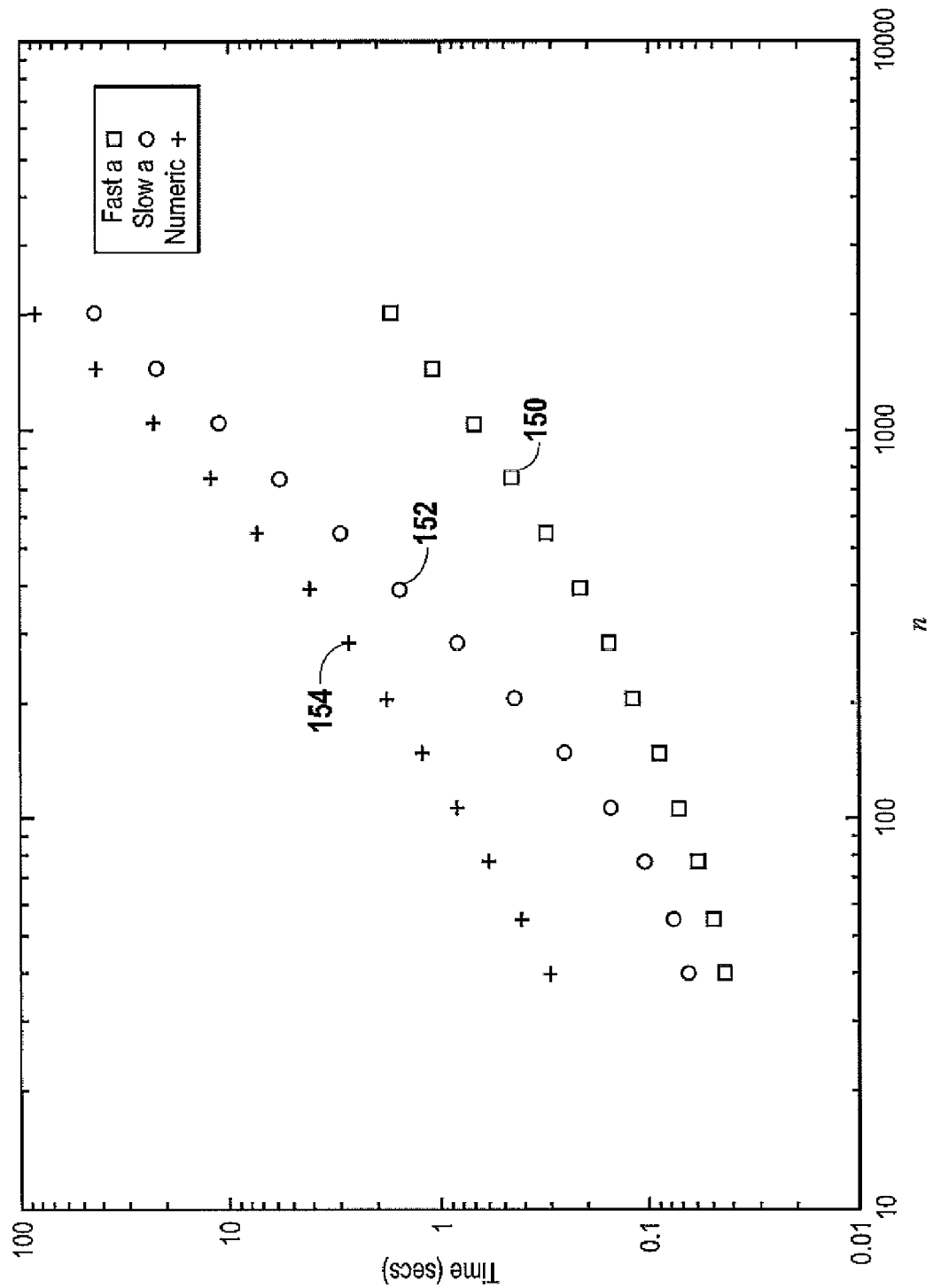
FIG. 4 is a graph plotting the fast analytical computation of the Jacobian of a residual, a slow analytic and a numerical approximation.

For concreteness, the residual computation with analytic Jacobian was coded and compared for accuracy and speed against a "slow" analytic version (one which does not exploit the reduced rank in the Jacobian computation) and a numerical approximation to the Jacobian. Run times are compared in FIG. 4 for varying number of channels. The difference in asympototic behavior with respect to n is evident. Specifically, referring to FIG. 4, run times of the fast analytical computation of the Jacobian (markers 150) of the residual are compared against a slow analytic (markers 152) and a numerical approximation (markers 154). The number of channels, n is shown in the horizontal axis, while the vertical axis is CPU time in seconds. The number of objects in the calibration and test groups remained constant, at 40 and 10 throughout, as did the number of PLS factors, 5. Times are the mean of seven runs, and single standard deviation bars are plotted, although they are mostly too small to see. For the case of 40 calibration objects and 10 test objects generated randomly with 2000 channels, the fast analytic computation of residual Jacobian took about 1.7 seconds, the slow analytic took about 44 seconds, and the numeric approximation took about 84 seconds on the platform tested (see Section 11 for details). Note that the "slow" analytic version is actually preferred in the case that m>n, as it runs in time $\Theta$ (mn$^2$l). However, in spectroscopy it is usually the case that m<n.

The BFGS Algorithm

The Boyden, Fletcher, Goldfarb and Shanno (BFGS) algorithm 3 is a quasi-Newton optimization algorithm. That is, the algorithm models a scalar function of many variables by a quadratic function with an approximate Hessian. The approximation to the Hessian is improved at each step by two rank one up-dates. The BFGS algorithm enjoys a number of properties which make it attractive to the numerical analyst: provable superlinear global convergence for some convex optimization problems; provable superlinear local convergence for some nonconvex problems; robustness and good performance in practice; deterministic formulation; relative simplicity of implementation; and, perhaps most importantly to the practical analyst, the algorithm has been implemented in a number of widely available libraries and packages, many of which accept the objective function as a blackbox.

The BFGS algorithm is an iterative solver. That is, it starts with some initial estimate of a good $\lambda$, say $\lambda^{(0)}$, and produces successive estimates, $\lambda^{(k)}$, which are supposed to converge to a local minimizer of the objective function. Each iteration consists of a computation of the gradient of the objective at $\lambda^{(k)}$. The algorithm constructs a search direction, call it $p^{(k)}$, by multiplying the inverse approximate Hessian by the negative gradient. Then a line search is performed to find an acceptable step in the search direction, that is to find the $\alpha^{(k)}$ used to construct $\lambda^{(k+1)}=\lambda^{(k)}+\alpha^{(k)}p^{(k)}$. In the backtracking algorithm used to perform line search described by Nocedal and Wright, a number of prospective values of $\alpha^{(k)}$ may be tested; the objective function must be computed for each prospective value, but the gradient need not be computed. [Algorithm 3.1] A fast implementation of the BFGS algorithm should not query the blackbox function for gradients during the backtracking phase.

As mentioned above, the BFGS requires some initial estimate of the Hessian of the objective function. When a good initial estimate of the Hessian is impractical, the practical analyst resorts to the identity matrix. Under this choice, the first search direction is the negative gradient, i.e., the direction of steepest descent. The BFGS constructs better estimates of the Hessian by local measurement of the curvature of the objective function.

Depending on the implementation, the BFGS algorithm may have to store the approximate Hessian of the objective function or the inverse approximate Hessian. In either case, the storage requirement is $\Omega(n^2)$. To avoid this, one can use the limited memory BFGS algorithm, which approximately the Hessian by a fixed number of the previous iterative updates, which avoids the need for quadratic storage. This method evidently works as well as BFGS in practice for many problems.

Selecting Wavelengths from an Optimal $\lambda$

Once a predictor weighting $\lambda$ has been found which gives a small RMSECV, the $\lambda$ is used to select a subset of the channels. That is, the embedding is reversed to find a subset of the channels in the discrete space of all such subsets which approximates the continuous solution given by $\lambda$. Without loss of generality, it may be assumed that $\lambda$ has unit norm, i.e., $\|\lambda\|_2=1$, since the effective WPLS regression vector is invariant under scaling, i.e., $c\wedge\beta(c\lambda)$ is constant for all nonzero values of c. This latter fact is proved by considering the output of the canonical WPLS algorithm, which normalizes the vectors $W^{(k)}$ and $T^{(k)}$. Moreover, the elements of $\lambda$ are assumed to be nonnegative, again without loss of generality.

Clearly, the weightings of the channels somehow signify their importance, and can be used in the selection of a subset of the channels. The ordering in significance indicated by $\lambda$ suggests n different possible choices of subsets 4, the $k^{th}$ of which is the subset with the k most significant channels. If the acceptable number of channels is bounded by an external restriction, say an upper bound of $n_f$, then one should select the subset of the $n_f$ most significant channels. Without any external restrictions, one should select the subset of channels (or "model") which minimizes some measure of predictive quality, such as RMSECV or an information criterion like Schwarz' Bayesian Information Criterion (BIC).

The asymptotic (in m) consistency of model selection criteria was examined by others. A number of differences exist between the formulation previously studied and that presented here: the present design matrix is assumed to be of reduced rank (i.e., equation 1 describes a reduced rank matrix) and nondeterministic (which previous work dismissed by simply stating that results would hold under almost any circumstance); the present linear model is built by PLS rather than OLS. However, absent any extant results for the reduced rank formulation, the present technique follows previous work set forth in Jun Shao's "Linear Model Selection by Cross-Validation," *Journal of the American Statistical Association,* 88(422):486-494 (June 1993) and "An Asymptotic Theory for Linear Model Selection," *Statistica Sinica,* 7:221-264 (1997), both of which are herein incorporated by reference in their entirety.

Specifically, Shao discloses twvo model comparison criteria: delete-d CV, and BIC. Delete-d CV is regular cross validation with d objects in the validation set. The model which minimizes RMSECV under the given grouping is selected. Because (md) can be very large, only a number of the possible CV groupings are used. Shao's study suggests that Monte Carlo selection of the DV groups can be effective only O (m) of the possible groupings used. Note also that Shao proves that d/m→1 is a prerequisite for asymptotic consistency. In the simulation study, d≈m−m$^{3/4}$ was used, and found to outperform delete-1 CV, especially in those tests where selecting overly large models is possible.

Shao also examined a class of model selection criteria which contains the General Information Criterion described in Rao and Wut's "A Strongly Consistent Procedure for Model Selection in a Regression Problem," *Biometrika,* 76(2):369-374 (1989), which is incorporated herein by reference in its entirety, the minimization of which, under certain assumptions, is equivalent to minimizing BIC. For a subset of k predictors, the reduced rank form of the criterion is $$BIC = \ln MSEP + \frac{\log m}{m-l-1}k,$$

where MSEP is based on the given set of k predictors and 1 factor PLS. The denominator term m−l−1 is used rather than m−k as suggested by Shao for the OLS formulation, based on a simulation study. This allows meaningful comparison in situations where k>m, although in this case the expected value of MSEP is penalized by a term quadratic in k/m. To continue the mongrelization of this criterion, it may be useful to replace MSEP by MSECV for appropriately chosen CV groups:

$$aBIC = \ln MSECV + \frac{\log m}{m-l-1}k.$$

Minimization of this criterion favors parsimony more than minimization of RMSECV alone. Until the asymptotic consistency of the reduced rank/PLS model selection problem is addressed theoretically, one criteria is not recommend over the other.

It is not obvious that the magnitudes of the elements of λ are sufficient to establish an importance ordering on the channels. For instance, it might be appropriate to multiply the elements of λ by the corresponding element of the linear model β chosen by WPLS on the entire data set, and use that Kronecker product vector as the importance ordering. As there seems to be no general trend in comparing the two methods, both techniques may be implemented and subsequently the information criterion may select whichever model is best, irrespective of which pragma produced the ordering.

Crafting an Objective Function

The ultimate goal is selection of a subset of the predictors which minimizes delete-d RMSECV or one of the information criteria. This should guide the choice of the objective function which we numerically minimize in the continuous framework. The obvious choice is to minimize RMSECV, however; the choice of the CV groups can lead to an asymptotically inconsistent selection procedure or long runtime. Moreover, the minimization of RMSECV may also select a en with a large number of nontrivial elements, which makes reversing the embedding difficult or noninformative.

Thus, one may choose to minimize an objective function which approximates one of the information criteria, balancing quality and parsimony, rather than minimizing RMSECV. Recall, for example, aBIC=ln MSECV+(k log m)/(m−l−1). The continuous embedding of the MSECV term with respect to λ is understood. To complete the embedding it only remains to estimate the subset size (number of predictors retained) of the model indicated by a continuous predictor weighting λ. A ratio of the p-norm to the q-norm may be used:

$$\kappa_{p,q}(\lambda) = \left(\frac{\|\lambda\|_p}{\|\lambda\|_q}\right)^{pq/(q-p)},$$

where $$\|\lambda\|_p = \left(\sum_j |\lambda_j|^p\right)^{1/p},$$

For $1 \leq p < q < \infty$ An appropriate choice of model size estimate may be $\kappa_{p,q}(\lambda)$. Note that $K_{p,q}$ is scale invariant, that is, $\kappa_{p,q}(\lambda)$ is constant for each nonzero choice of the scalar C.

Figure 5:
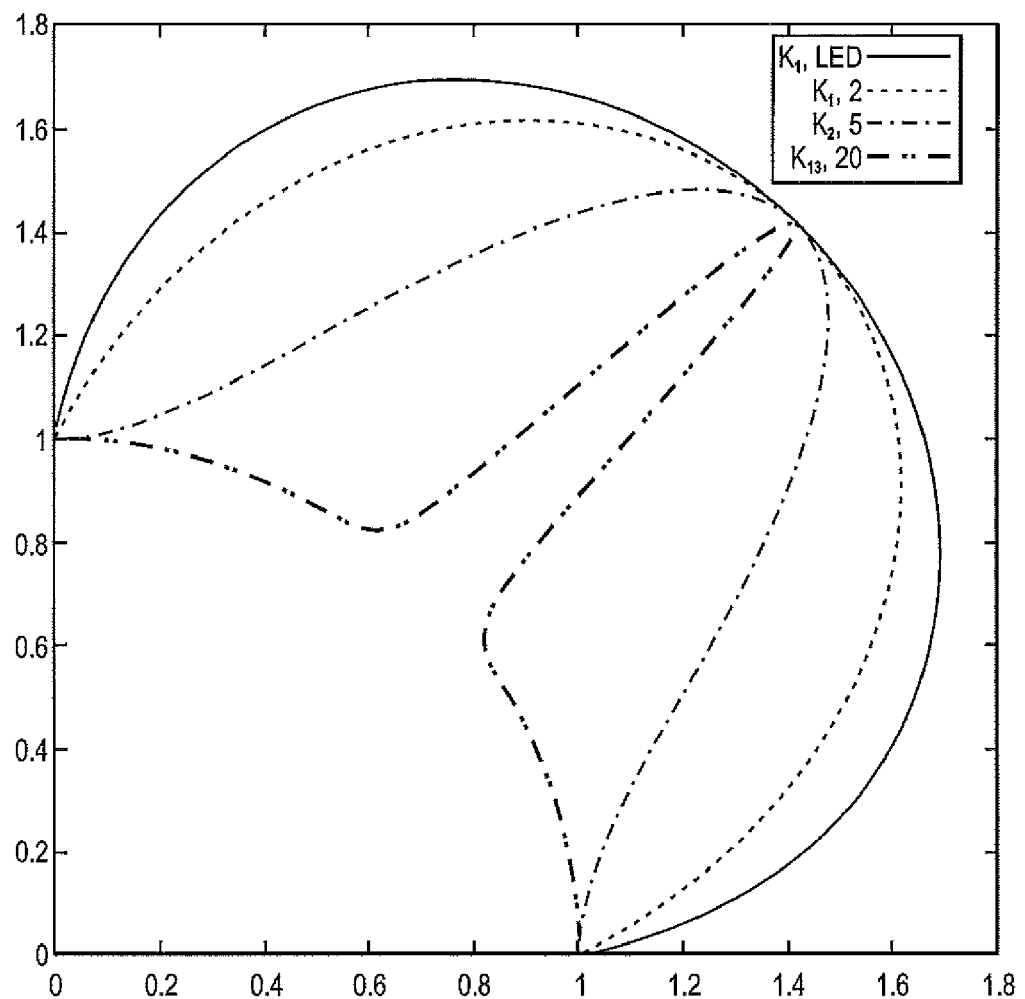
FIG. 5 illustrates a plot of the function $K_{p,q}(\lambda)$ in polar coordinates for the two dimensional vector $\lambda=(\cos\theta, \sin\theta)$, and various values of p and q in the quadrant $0 \leq \theta \leq \pi/2$.

Also note that if λ consists of j ones and n−j zeros, then $\kappa_{p,q}(\lambda)=j$. FIG. 5 illustrates the behavior of this function for various values of p,q. Specifically, the function $\kappa_{p,q}(\lambda)$ is plotted in polar coordinates for the two dimensional vector λ=(cos θ, sin θ), and various values of p,q in the quadrant $0 \leq \theta \leq \pi/2$. Note that each of the plots passes through (0,1), (π/4,2) and (π/2,1), as guaranteed by the fact that $K_{p,q}$ measures the number of nonzero elements in a scaled binary vector. Using smaller values of p,q creates a stronger drive towards binary vectors by penalizing non binary vectors. This function is ad-hoc and, as such, there may be a more statistically valid substitute. However, it may be well approximated by a $K_{p,q}$ function.

Thus, to approximately minimize BIC, $\phi(\lambda) = _{df}\ln(MSECV(\lambda)) + (\ln(m)\kappa_{p,q}(\lambda))/(m-l-1)$, may be minimized, the gradient of which is $$\nabla_\lambda \psi(\lambda) = \frac{\Delta_\lambda MSECV(\lambda)}{MSECV(\lambda)} + (\ln(m)\nabla_\lambda k_{p,q}(\lambda))/(m-l-1).$$

Implementation Notes

The method was implemented in the Matlab™ language. All results set forth herein were performed in the GPL Matlab clone, GNU Octave (version 2.1.69), compiled with BLAS, on an AMD Athlon 64 4000+ (2.4 GHz) running Gentoo Linux, 2.6.15 kernel.

The BFGS and backtracking line search algorithms were implemented as outlined by Nocedal and Wright in *Numerical Optimization*, Springer Series in Operations research, Springer-Verlag, New York, N.Y. (1999), which is incorporated herein by reference in its entirety. The objective function was supplemented by an optional term to simulate BIC, with the p and q terms of $K_{p,q}$ tunable parameters. The inverse of the sample standard deviation of each channel is generally used as the starting iterate, $\lambda^{(0)}$. The initial approximation to the Hessian is taken as some constant times the identity matrix. Termination of BFGS was triggered by the computation of a gradient smaller in norm than a lower bound, by an upper limit on the number of major iterates, function evaluations, or achievement of a lower bound on the change of the objective function. Object weighting (i.e., WPLS) has not yet been implemented.

Selection of optimal wavelengths was performed by minimization of a delete-d RMSECV or a BIC, with the different models determined by ordering of λ or by diag (β)λ, whichever is chosen by the information criterion. The trivial model (responses are normal with approximated means and variances and predictors are ignored) is also compared. An optional post-selection minimization is allowed on the selected channels. The final results consist of a subset of the available channels and predictor weightings for those channels. This bit of cheating allows the method to keep the advantages of properly weighted channels. Note that the weighting is irrelevant and ignored in the case where the number of selected channels is equal to the number of latent factors.

Unless specified by the user, the system must choose the cross validation groups. By default, this is done using the Monte Carlo framework suggested by Shao: 2m different partitions of $m^{3/4}$ calibration objects and $m-m^{3/4}$ test objects are randomly selected.

Experiments and Results

SRCEK was tested on the three data sets used to compare wavelength selection procedures by Forina et al. As in the original publication, these are referred to as Moisture, Kalivas, and Artificial. The data set Moisture consists of moisture responses of 60 samples of soy flour, with predictors measured with a filter instrument and originally appeared in Forina et al. "Transfer of Calibration Function in Near-Infrared Spectroscopy," *Chemometrics and Intelligent Laboratory Systems,* 27(2):189-203, which is incorporated herein in its entirety by reference. The data set of Kalivas, originally from a paper by Kalivas ("Two Data Sets of Near Infrared Spectra," *Chemometrics and Intelligent Laboratory System,* 37(2):255-259), which is incorporated herein by reference in its entirety, consists of moisture responses of 100 samples of wheat flour, with 701 responses measured by an NIR spectrometer. The data set Artificial consists of 400 randomly generated objects with 300 predictors. The predictors are grouped into six classes, with a high degree of correlation between elements of the first five classes, each consisting of 10 channels. The response was generated by a linear combination of five of the responses (the first response in each of the first five classes), plus some noise; the 250 predictors of the sixth class are entirely irrelevant to the responses. However, the level of noise in the response is large enough to mask the effects of the fifth relevant predictor. The objects are divided into a training set of 100 objects, and an external set with the remainder.

In order to allow meaningful comparisons between the results found here and in the study of Forina et al., RMSECV values using the same CV groupings of that study were used. These were generated by dividing the objects into groups in their given order. Thus, e.g., the first group consists of the $1^{st}$, $6^{th}$, $11^{th}$ objects and so on, the second group is the $2^{nd}$, $7^{th}$, $12^{th}$ objects and so on, etc., for a total of five groups. However, the objective function was computed based on other groupings, as described below.

Note that, in light of Shao's studies, the CV groupings used by Forina et al. seem sparse both in number and in the number deleted (m/5). For this reason, it may be meaningless to compare the different subset selection techniques based on the RMSECV for this grouping. However, since the predictors retained by the different methods are not reported for the data sets Kalivas and Artificial, the results of SRCEK can only be compared to those of the other methods by the RMSECV of this grouping or by the aBIC based on that RMSECV. For Moisture, Forina et al. reported the selected predictors, making comparison based on Monte Carlo CV Groupings possible. These are denoted by RMSEMCCV, and based on 120 delete-38 groupings.

SRCEK was applied to Moisture with 120 delete-38 Monte Carlo CV groups, using RMSEMCCV as the objective function for 2 and 3 factor PLS. Termination was triggered by small relative change in the objective (relative tolerance in objective of 10-5), which was achieved in both cases in at most 25 major iterates. Model selection is performed by minimization of aBIC. Results are summarized in Table 1, and compared to the results found by Forina et al. For two factor PLS, SRCEK selects two predictors, L14:2100 and L16.1940, the same choice made by SOLS and GA-OLS. For three factor PLS, SRCEK selects three predictors, adding L20:1680 to the previous two predictors. The two factor choice is preferred by both the DV error and aBIC. In this case, aBIC matches an intuitive ordering of these results.

TABLE 1

| Method | L | K | RMSECV | aBIC | RMSEMCCV | aBIC |
|---|---|---|---|---|---|---|
| PLS | 2 | 19 | 1.369 | 1.99 | 1.438 | 2.09 |
| MUT | 2 | 8 | 1.354 | 1.18 | 1.407 | 1.26 |
| UVE norml | 2 | 7 | 1.350 | 1.10 | 1.403 | 1.18 |
| UVE 95 | 2 | 10 | 1.346 | 1.31 | 1.395 | 1.38 |

TABLE 1-continued

| Method | L | K | RMSECV | aBIC | RMSEMCCV | aBIC |
|---|---|---|---|---|---|---|
| GOLPE I | 2 | 15 | 1.319 | 1.63 | 1.389 | 1.73 |
| UVE 90 | 2 | 12 | 1.338 | 1.44 | 1.387 | 1.52 |
| IPW | 3 | 3 | 1.308 | 0.756 | 1.361 | 0.836 |
| GOLPE III | 2 | 3 | 1.307 | 0.752 | 1.356 | 0.824 |
| MAXCOR | 2 | 10 | 1.268 | 1.19 | 1.318 | 1.27 |
| ISE | 2 | 2 | 1.264 | 0.613 | 1.311 | 0.686 |
| GOLPE II | 2 | 6 | 1.256 | 0.887 | 1.298 | 0.953 |
| SOLS(5) | 2 | 2 | 1.203 | 0.514 | 1.240 | 0.574 |
| SRCEK(2) | 2 | 2 | 1.203 | 0.514 | 1.240 | 0.574 |
| SRCEK(3) | 3 | 3 | 1.259 | 0.680 | 1.285 | 0.720 |

Results from selection methods applied to data set Moisture are shown ordered by decreasing RMSEMCCV (120 delete-38 MC groupings), with results from SRCEK, in Table 1, which is adapted from the study of Forina et al. The number of retained predictors is indicated by k, the number of latent factors is 1. The RMSECV based on the groupings of Forina et al. are also given. Two aBIC values are reported, based on the Forina and Monte Carlo CV groupings. The last digit of the SOLS(5) method RMSECV was apparently misreported by Forina et al.

The results of SRCEK applied to Kalivas are summarized in Table 2, and compared to the results from the previous study. Several experiments were attempted, each using three to five factors. Each use a factor of all ones as the initial $\lambda$, and 80 delete-68 MC CV groups for computing RMSECV. In experiments (a) and (b), RMSECV is minimized, and predictor selection is made based on, respectively, RMSECV or aBIC. In the experiments (c) and (d), the embedded aBIC (using k1,1.01) is minimized, and selection is based on, respectively, RMSECV or aBIC.

Figure 6:
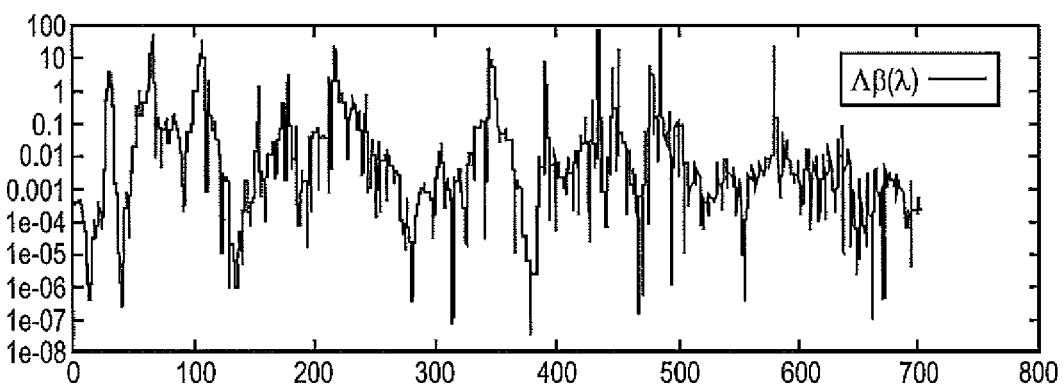
FIG. 6 is a plot of the vector $\Lambda\beta(\lambda)$ for post-optimization $\lambda$ on data set Kalivas, wherein RMSECV for MC CV groups was used as the objective function.
Figure 7:
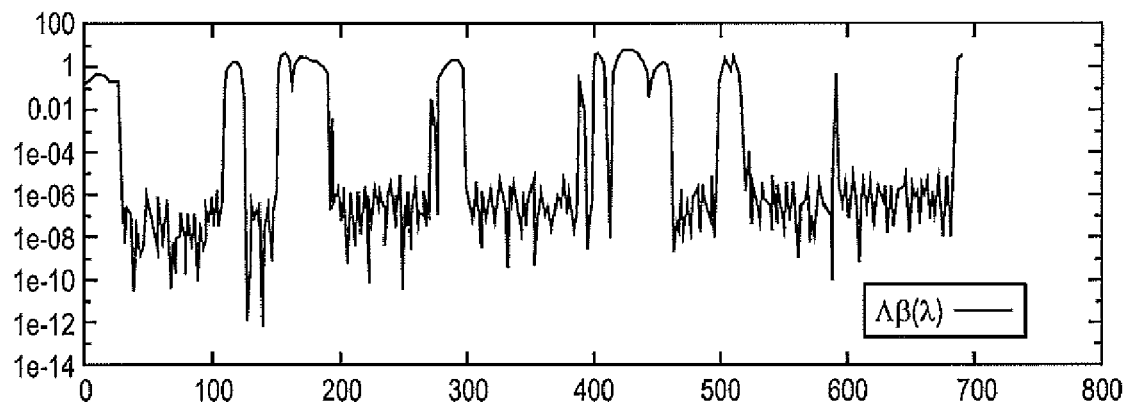
FIG. 7 is a plot of the vector $\Lambda\beta(\lambda)$ for post-optimization $\lambda$ on data set Kalivas, wherein the embedded aBIC using the same CV groups for the RMSECV part and $K_{1,1.01}$ was minimized.

The effect of the objective function on the algorithm outcome for this data set is shown in FIGS. 6 and 7. In FIGS. 6 and 7, graphs showing the effective regression vector $\Lambda\beta(\lambda)$, for the $\lambda$ found by BFGS minimization are illustrated. Specifically, the vector $\Lambda\beta(\lambda)$ is plotted for post-optimization $\lambda$ on data set Kalivas. In FIG. 6, RMSEVC for MC CV groups was used as the objective function, while in FIG. 7, the embedded aBIC using the same CV groups for the RMSECV part and $K_{1,1.01}$ was minimized. When RMSECV alone is minimized, the regression vector has no clear structure. However, when aBIC is minimized, the regression vector divides the predictors into two groups, those with 'low' relevance, and those with 'high' relevance. Moreover, as expected from spectroscopic data, the relevant predictors appear in contiguous groups.

TABLE 2

| Method | L | K | RMSECV | aBIC | RMSEMCCV |
|---|---|---|---|---|---|
| PLS | 5 | 701 | 0.2218 | 3.13E+01 | |
| MAXCOR | 5 | 684 | 0.2217 | 3.05E+01 | |
| UVE 95% | 5 | 657 | 0.2227 | 2.92E+01 | |
| GOLPE I | 6 | 648 | 0.2216 | 2.91E+01 | |
| MUT | 6 | 575 | 0.2227 | 2.55E+01 | |
| GOLPE II | 6 | 352 | 0.2167 | 1.44E+01 | |
| GOLPE III | 6 | 32 | 0.2231 | −1.42E+00 | |
| LASSO | 14 | 14 | 0.2153 | −2.31E+00 | |
| VS | 6 | 14 | 0.2111 | −2.42E+00 | |
| IPW 3 | 3 | 11 | 0.2174 | −2.52E+00 | |
| IPW 2 | 2 | 11 | 0.2155 | −2.55E+00 | |
| GAPLS | 6 | 11 | 0.2078 | −2.60E+00 | |
| ISE | 2 | 7 | 0.2151 | −2.74E+00 | |
| SOLS(2) | 2 | 2 | 0.2408 | −2.75E+00 | |
| SOLS(4) | 4 | 4 | 0.2207 | −2.83E+00 | |
| GAOLS a | 4 | 4 | 0.2154 | −2.88E+00 | |
| GAOLS b | 4 | 4 | 0.209 | −2.94E+00 | |

TABLE 2-continued

| Method | L | K | RMSECV | aBIC | RMSEMCCV |
|---|---|---|---|---|---|
| SRCEK(3) d | 3 | 3 | 0.2305 | -2.79E+00 | 0.25195 |
| SRCEK(3) d | 4 | 20 | 0.2739 | -1.62E+00 | 0.30089 |
| SRCEK(3) d | 5 | 5 | 0.2877 | -2.25E+00 | 0.3179 |
| SRCEK(3) c | 3 | 11 | 0.231 | -2.40E+00 | 0.24823 |
| SRCEK(3) c | 4 | 24 | 0.2627 | -1.51E+00 | 0.28804 |
| SRCEK(3) c | 5 | 17 | 0.2779 | -1.73E+00 | 0.31725 |
| SRCEK(3) a | 3 | 30 | 0.2017 | -1.76E+00 | 0.20896 |
| SRCEK(3) a | 4 | 28 | 0.1914 | -1.95E+00 | 0.20958 |
| SRCEK(3) a | 5 | 26 | 0.1935 | -2.01E+00 | 0.20842 |
| SRCEK(3) b | 3 | 6 | 0.2068 | -2.86E+00 | 0.22187 |
| SRCEK(3) b | 4 | 8 | 0.202 | -2.81E+00 | 0.21891 |
| SRCEK(3) b | 5 | 8 | 0.1993 | -2.83E+00 | 0.22755 |

Results from selection methods applied to data set Kalivas are shown ordered by decreasing aBIC, with results from SRCEK. The results of SRCEK, and other methods, applied to Artificial are summarized in Table 3, below.

TABLE 3

| Method | L | K | RMSECV | aBIC | Kbad | ext RMSEP | RMSEMCCV |
|---|---|---|---|---|---|---|---|
| GOLPE I | 3 | 279 | 207.6 | 2.41E+01 | 229 | 229.1 | |
| GOLPE II | 3 | 142 | 141.1 | 1.67E+01 | 102 | 207.9 | |
| ISE | 3 | 109 | 122.2 | 1.48E+01 | 63 | 206.7 | |
| UVE | 3 | 67 | 139.5 | 1.31E+01 | 17 | 189.6 | |
| MUT | 3 | 59 | 147.8 | 1.28E+01 | 9 | 184.5 | |
| ISE | 3 | 61 | 121.3 | 1.25E+01 | 17 | 189.1 | |
| MAXCOR | 3 | 42 | 171.7 | 1.23E+01 | 2 | 192.6 | |
| GOLPE III | 4 | 34 | 166.1 | 1.19E+01 | 12 | 199.8 | |
| SOLS(20) | 20 | 20 | 106.1 | 1.05E+01 | 13 | 240.5 | |
| GAPLS | 4 | 17 | 122.2 | 1.04E+01 | 11 | 214 | |
| SOLS(4) | 4 | 4 | 166.9 | 1.04E+01 | 0 | 195.3 | |
| IPW | 4 | 4 | 163.3 | 1.04E+01 | 0 | 192.6 | |
| SOLS(5) | 5 | 5 | 154.8 | 1.03E+01 | 0 | 180.5 | |
| GAOLS | 10 | 10 | 126 | 1.02E+01 | 3 | 218.3 | |
| SRCEK(3) a | 3 | 4 | 164.3 | 1.04E+01 | 0 | 196.1 | 176.2 |
| SRCEK(4) a | 4 | 36 | 170.6 | 1.20E+01 | 0 | 193.3 | 178.3 |
| SRCEK(5) a | 5 | 33 | 131.1 | 1.14E+01 | 14 | 195.3 | 148.2 |
| SRCEK(6) a | 6 | 23 | 153.9 | 1.12E+01 | 4 | 209.1 | 171.1 |
| SRCEK(3) b | 3 | 4 | 164.3 | 1.04E+01 | 0 | 196.1 | 176.2 |
| SRCEK(4) b | 4 | 14 | 261.5 | 1.18E+01 | 0 | 253.8 | 277.1 |
| SRCEK(5) b | 5 | 5 | 166.5 | 1.05E+01 | 0 | 199.2 | 175.1 |
| SRCEK(6) b | 6 | 19 | 154.1 | 1.10E+01 | 3 | 207.5 | 172.7 |

Results from selection methods applied to data set Artificial are shown in Table 3 ordered by decreasing aBIC, with results from SRCEK. The number of uninformative predictors selected is shown as well as the RMSEP for the external set of 300 objects.

Figure 8:
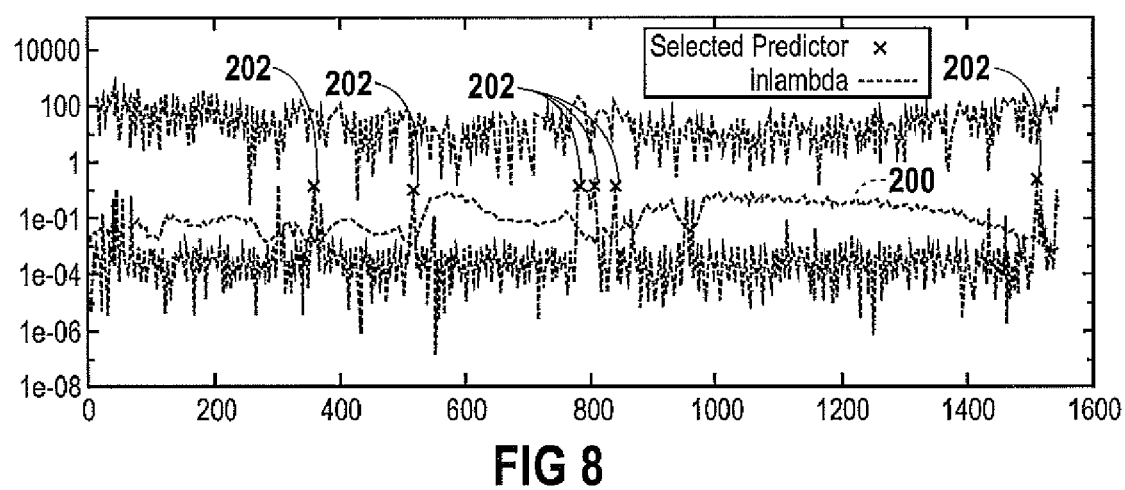
FIG. 8 illustrates experimental results of using the SRCEK method to select predictors using a 2 factor WPLS to predict for water.
Figure 9:
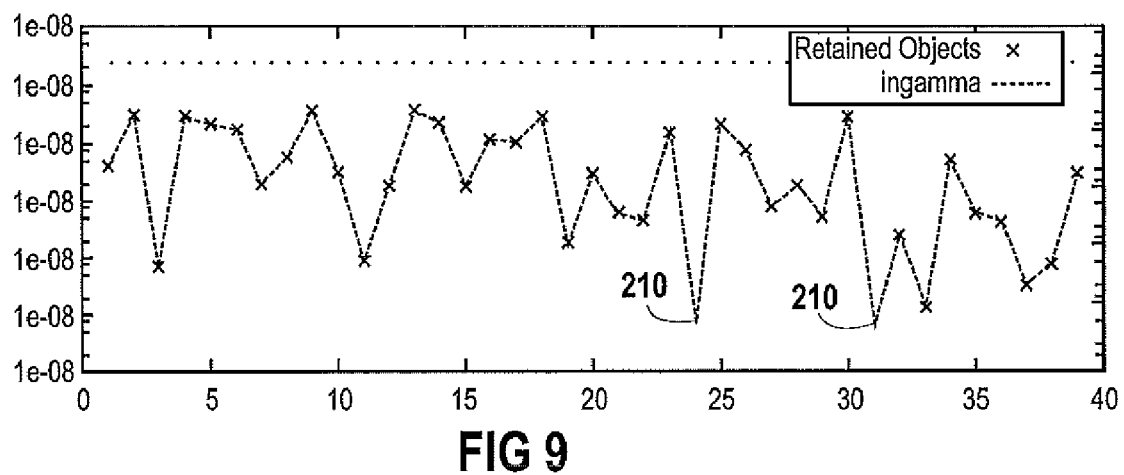
FIG. 9 illustrates object weightings resulting from the use of the SRCEK method.

Referring to FIGS. 8 and 9, the end results of SRCEK applied to tissue phantoms, using a two factor WPLS to predict water are shown. In FIG. 8, the effective weighted regression vector 200 across the channels of the spectrometer is illustrated. Additionally, 15 selected predictors 202 are each indicated by an "x." FIG. 9 shows the object weightings along with 37 retained objects (shown as x's. Two object weightings were reveled to be outliers 210. The WPLS model output by the algorithm explains 98% of the observed variance in the response, although without an information theoretic study of the problem, it is not clear this a meaning measure. The PLS model explains only 91% of the variance, Directions for Further Study The RMSECV should be optimizable with respect to predictor weightings, $\gamma$, in addition to predictor weights $\lambda$. Algorithm 3 may be altered to also compute the gradients with respect to $\gamma$. The increased degrees of freedom, however, increases the risk of overfitting. The embedded information criterion objective function described above may be altered to balance this risk. Since it is assumed the data are distributed as $y_j \sim X_j^T \beta + b_0 N(0, \sigma^2/\gamma_j)$, m−1 new estimated parameters have been added by way of the separate variances of each observation. One strategy to embed the information criterion then, is to let $\phi(\lambda) = \ln(\text{MSECV}(\lambda)) + (\kappa_{p,q}(\lambda) - \kappa_{p,q}(\gamma y))\ln(m)/(m-1-1)$. The initial estimate should be that of homoscedasticity. This has not been explored as a valid measure of quality, however, the SRCEK method may be used to optimize both the vectors $\lambda$ and $\gamma$ simultaneously, and use this function for the final comparison. Again, the problem is that increasing the number of fit parameters increases the chances of overfitting. This comparison function $\phi$ punishes models with a lot of parameter in the $K_{p,q}$ term. That is, if there are many significant $\lambda$ (i.e. many channels) or few significant $\gamma$ (i.e. few high-weighted samples), then $\phi$ is big, and smallest $\phi$ may be used for selection of wavelengths. It is not clear if the balance betnveen $K_{p,q}(\lambda)$ and $K_{p,q}$ Kp,q($\gamma$) is correct—that is, whether one sample can count against one channel in this manner. In any event, this $\phi$ function is an example of one possibility, but others may be found which may be better.

The method of ordering the successively larger models based on the optimal $\lambda$, or on the Kronecker product of $\lambda$ with the regression coefficient seems rather ad hoc. This step may also benefit from some theory, or may perhaps be replaced by strategies cribbed from other predictor selection techniques (e.g., IPW). Conversely, some of these techniques may benefit from a preliminary channel weight optimization step via BFGS.

The SRCEK method may also be extended to Kernel PLS regression, however, it may require the kernel to also compute derivatives. Additionally, an analysis of the structure of the RMSECV and embedded aBIC objective functions may be interesting to determine whether either can be shown to be convex (in %) in general or under assumptions on the data X and y which are justifiable in the chemometric context and whether sufficient sizes for the CV groupings can be found to sufficiently reduce dependence of the objective on the groupings.

The iterates of the BFGS algorithm for this objective function often display a zigzagging behavior towards the minimum. Often this is the result of some elements of $\lambda$ "overshooting" zero. It may be possible to avoid this by using other minimization techniques, for example the conjugate gradient method, or a proper constrained minimization implementation of BFGS.

As mentioned above, the SRCEK method as described herein has many tweakable parameters: initial iterate $\lambda^{(0)}$, initial approximation of the Hessian, termination condition for BFGS, choice of objective function, p and q for the continuous embedding of number of estimated parameters, etc. While these provide many possibilities to the researcher of the technique, they are an obstacle for the end user. Thus, reasonable heuristics for setting these parameters which work well in a wide range of settings would be welcome.

Specific embodiments have been shown by way of example in the drawings and have been described in detail herein. However, it should be understood that the claims are not intended to be limited to the particular forms disclosed. Rather, the claims are to cover all modifications, equivalents, and alternatives falling within their spirit and scope.

What is claimed is:

1. A method for selecting useful channels in a non-invasive medical device comprising:
   embedding a discrete predictor problem into continuous space of a predictor preweighting;
   executing an optimization algorithm to optimize a preweighting vector, wherein the optimization algorithm determines the relative importance of the each predictor;
   constructing n different models, wherein a $k^{th}$ model comprises the k most important predictors;
   comparing the models using an information criterion to allow for automatic selection of a subset of the predictors; and
   deriving an analytical Jacobian of the partial least squares regression vector with respect to the predictor weighting to optimize the predictor weighting and select useful channels for use in the non-invasive medical device.

2. The method of claim 1, wherein executing an optimization algorithm comprises using a quasi-Newton optimization algorithm.

3. The method of claim 1, wherein comparing the models using an information criterion comprises using a Bayesian Information Criterion.

4. The method of claim 1 wherein executing an optimization algorithm comprises using a root mean square error cross validation and gradient.

5. The method of claim 1 wherein executing an optimization algorithm comprises using a partial least squares regression.

6. The method of claim 1 wherein executing an optimization algorithm comprises using a weighted partial least squares regression.

7. The method of claim 1, wherein executing an optimization algorithm comprises using a rank sensitive implicit weighted partial least squares regression.

8. The method of claim 1 wherein executing an optimization algorithm comprises using a weighted partial least squares computation with a Jacobian.

9. The method of claim 1, wherein executing an optimization algorithm comprises using a BFGS algorithm.

10. The method of claim 3, wherein the Bayesian Information Criterion is computed as $$aBIC = \ln MSECV + \frac{\log m}{m-l-1}k.,$$

wherein MSECV stands for mean squared error of cross validation, m is a number of objects, l is relevant latent factors, and k is useful predictors.

11. A system for identifying useless predictors comprising:
   a memory storing a predictor preweighting algorithm embedded with a discrete predictor problem; and
   a processor communicatively coupled to the memory and configured to execute the algorithm to, wherein execution of the algorithm by the processor comprises:
      executing an optimization algorithm to optimize a preweighting vector, wherein the optimization algorithm determines the relative importance of the each predictor;
      constructing n different models, wherein a $k^{th}$ model comprises the k most important predictors;
      automatically selecting a subset of predictors by comparing the models using an information criterion; and
      deriving an analytical Jacobian of the partial least squares regression vector with respect to the predictor weighting to optimize the predictor weighting and select useful channels for use in the non-invasive medical device.

12. The system of claim 11, wherein executing an optimization algorithm comprises executing a quasi-Newton optimization algorithm.

13. The system of claim 11, wherein automatically selecting a subset of predictors by using an information criterion comprises using a Bayesian Information Criterion.

14. The system of claim 11 comprising a non-invasive sensor configured to generate signals corresponding to detected light, wherein the processor is configured to receive digitized versions of the signals and compute physiological parameters.

15. The system of claim 14 comprising a display configured to display the computed physiological parameters.

* * * * *